(12) United States Patent
Sagisaka et al.

(10) Patent No.: US 10,988,684 B2
(45) Date of Patent: *Apr. 27, 2021

(54) ELECTROCHROMIC COMPOUND, ELECTROCHROMIC COMPOSITION, ELECTROCHROMIC ELEMENT, AND ELECTROCHROMIC DIMMING ELEMENT

(71) Applicant: RICOH COMPANY, LTD., Tokyo (JP)

(72) Inventors: Toshiya Sagisaka, Kanagawa (JP); Satoshi Yamamoto, Kanagawa (JP); Takashi Okada, Kanagawa (JP); Masato Shinoda, Kanagawa (JP); Shigenobu Hirano, Kanagawa (JP); Fuminari Kaneko, Kanagawa (JP); Mamiko Inoue, Tokyo (JP); Daisuke Goto, Kanagawa (JP); Tohru Yashiro, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 15/554,289

(22) PCT Filed: Feb. 9, 2016

(86) PCT No.: PCT/JP2016/000680
§ 371 (c)(1),
(2) Date: Aug. 29, 2017

(87) PCT Pub. No.: WO2016/147543
PCT Pub. Date: Sep. 22, 2016

(65) Prior Publication Data
US 2018/0044581 A1  Feb. 15, 2018

(30) Foreign Application Priority Data

Mar. 13, 2015 (JP) .............................. JP2015-050266
Oct. 22, 2015 (JP) .............................. JP2015-208313

(51) Int. Cl.
| | | |
|---|---|---|
| *C09K 9/02* | (2006.01) | |
| *C07F 9/6558* | (2006.01) | |
| *G02F 1/15* | (2019.01) | |
| *G02F 1/153* | (2006.01) | |
| *C07F 9/58* | (2006.01) | |
| *G02F 1/155* | (2006.01) | |
| *G02F 1/1516* | (2019.01) | |

(52) U.S. Cl.
CPC ................. *C09K 9/02* (2013.01); *C07F 9/58* (2013.01); *C07F 9/65583* (2013.01); *C07F 9/65586* (2013.01); *G02F 1/15* (2013.01); *G02F 1/153* (2013.01); *G02F 1/155* (2013.01); *C09K 2211/1011* (2013.01); *C09K 2211/1014* (2013.01); *C09K 2211/1029* (2013.01); *C09K 2211/1044* (2013.01); *C09K 2211/1051* (2013.01); *C09K 2211/1055* (2013.01); *C09K 2211/1092* (2013.01); *G02F 1/15165* (2019.01); *G02F 2001/1517* (2013.01); *G02F 2001/164* (2019.01)

(58) Field of Classification Search
None
See application file for complete search history.

(56) References Cited

U.S. PATENT DOCUMENTS 6,203,154 B1  3/2001  Kobayashi et al.
6,301,038 B1  10/2001  Fitzmaurice et al.
(Continued)

FOREIGN PATENT DOCUMENTS

DE  102006061999 A1  6/2008
DE  102007023747 A1  11/2008
(Continued)

OTHER PUBLICATIONS

International Search Report and Written Opinion dated Apr. 12, 2016 for counterpart International Patent Application No. PCT/JP2016/000680 filed Feb. 9, 2016.
Li, Mei, et al., "Highly contrasted and stable electrochromic device based on well-matched viologen and triphenylamine," Organic Electronics, vol. 15 (2014), pp. 428-434.
Office Action dated Dec. 26, 2018 in Korean Patent Application No. 10-2017-7029118, 14 pages (with English translation).
Office Action dated Oct. 29, 2019, in Japanese Patent Application No. 2015-208313, filed Oct. 22, 2015.

*Primary Examiner* — Alicia L Otton
(74) *Attorney, Agent, or Firm* — Oblon, McClelland, Maier & Neustadt, L.L.P.

(57) ABSTRACT

To provide an electrochromic compound represented by the following general formula (1) where $X^1$ and $X^2$ are each independently a carbon atom or a nitrogen atom, $R^1$, $R^2$ and $R^3$ are each independently a halogen atom, a substituted or unsubstituted alkyl group, or a substituted or unsubstituted alkoxy group, x is an integer selected from 0 through 3, y and z are each independently an integer selected from 0 through 4, and at least one of $L^1$ and $L^2$ is a monovalent functional group bonded to a nitrogen atom of a pyridinium ring directly, or via a divalent substituent.

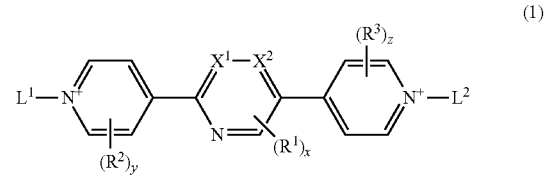

(1)

12 Claims, 5 Drawing Sheets

(56) References Cited

U.S. PATENT DOCUMENTS

| | | |
|---|---|---|
| 7,029,833 B2 | 4/2006 | Takahashi et al. |
| 7,333,259 B2 | 2/2008 | Hirano et al. |
| 7,474,322 B2 | 1/2009 | Takahashi et al. |
| 7,830,584 B2 | 11/2010 | Shibuya et al. |
| 8,384,983 B2 | 2/2013 | Yashiro et al. |
| 8,531,754 B2 | 9/2013 | Fujimura et al. |
| 8,593,715 B2 | 11/2013 | Yashiro et al. |
| 8,625,186 B2 | 1/2014 | Okada et al. |
| 8,687,262 B2 | 4/2014 | Yashiro et al. |
| 8,736,941 B2 | 5/2014 | Naijo et al. |
| 8,743,048 B2 | 6/2014 | Takahashi et al. |
| 8,937,758 B2 | 1/2015 | Kim et al. |
| 9,041,997 B2 | 5/2015 | Takahashi et al. |
| 9,069,222 B2 | 6/2015 | Naijo et al. |
| 2002/0167480 A1 | 11/2002 | Johnson et al. |
| 2005/0012977 A1 | 1/2005 | Mizuno |
| 2006/0204866 A1 | 9/2006 | Hirano et al. |
| 2006/0215250 A1 | 9/2006 | Shibuya et al. |
| 2008/0013152 A1 | 1/2008 | Hirano et al. |
| 2008/0112033 A1 | 5/2008 | Shibuya et al. |
| 2009/0231663 A1 | 9/2009 | Hirano et al. |
| 2009/0231664 A1 | 9/2009 | Shibuya et al. |
| 2012/0050838 A1 | 3/2012 | Hirano et al. |
| 2012/0069418 A1 | 3/2012 | Kanitz et al. |
| 2013/0258439 A1 | 10/2013 | Naijo et al. |
| 2015/0168796 A1 | 6/2015 | Yashiro et al. |
| 2015/0198857 A1 | 7/2015 | Yashiro et al. |
| 2015/0274761 A1 | 10/2015 | Sagisaka et al. |
| 2015/0331295 A1 | 11/2015 | Takahashi et al. |
| 2015/0378233 A1 | 12/2015 | Fujimura et al. |
| 2016/0005375 A1 | 1/2016 | Naijo et al. |
| 2018/0113366 A1* | 4/2018 | Kaneko ............... G02F 1/13439 |
| 2018/0194995 A1* | 7/2018 | Archambeau ............ C09K 9/02 |

FOREIGN PATENT DOCUMENTS

| | | |
|---|---|---|
| JP | 2506312 Y2 | 5/1996 |
| JP | 11-183938 A | 7/1999 |
| JP | 2003-121883 A | 4/2003 |
| JP | 2003-161964 A | 6/2003 |
| JP | 2003-270671 A | 9/2003 |
| JP | 2004-151265 A | 5/2004 |
| JP | 2004-520621 A | 7/2004 |
| JP | 2004-361514 A | 12/2004 |
| JP | 2006-106669 A | 4/2006 |
| JP | 3955641 B2 | 5/2007 |
| JP | 4093958 B2 | 3/2008 |
| JP | 2008-122578 A | 5/2008 |
| JP | 4838503 B2 | 10/2011 |
| JP | 2012-224548 A | 11/2012 |
| JP | 2013-114144 A | 6/2013 |
| JP | 2014-111710 A | 6/2014 |
| JP | 2016-038572 A | 3/2016 |
| JP | 2016-045464 A | 4/2016 |
| WO | WO 03/009059 A1 | 1/2003 |
| WO | WO 2008/077864 A1 | 7/2008 |
| WO | WO 2008/142047 A1 | 11/2008 |

* cited by examiner

[Fig. 1]
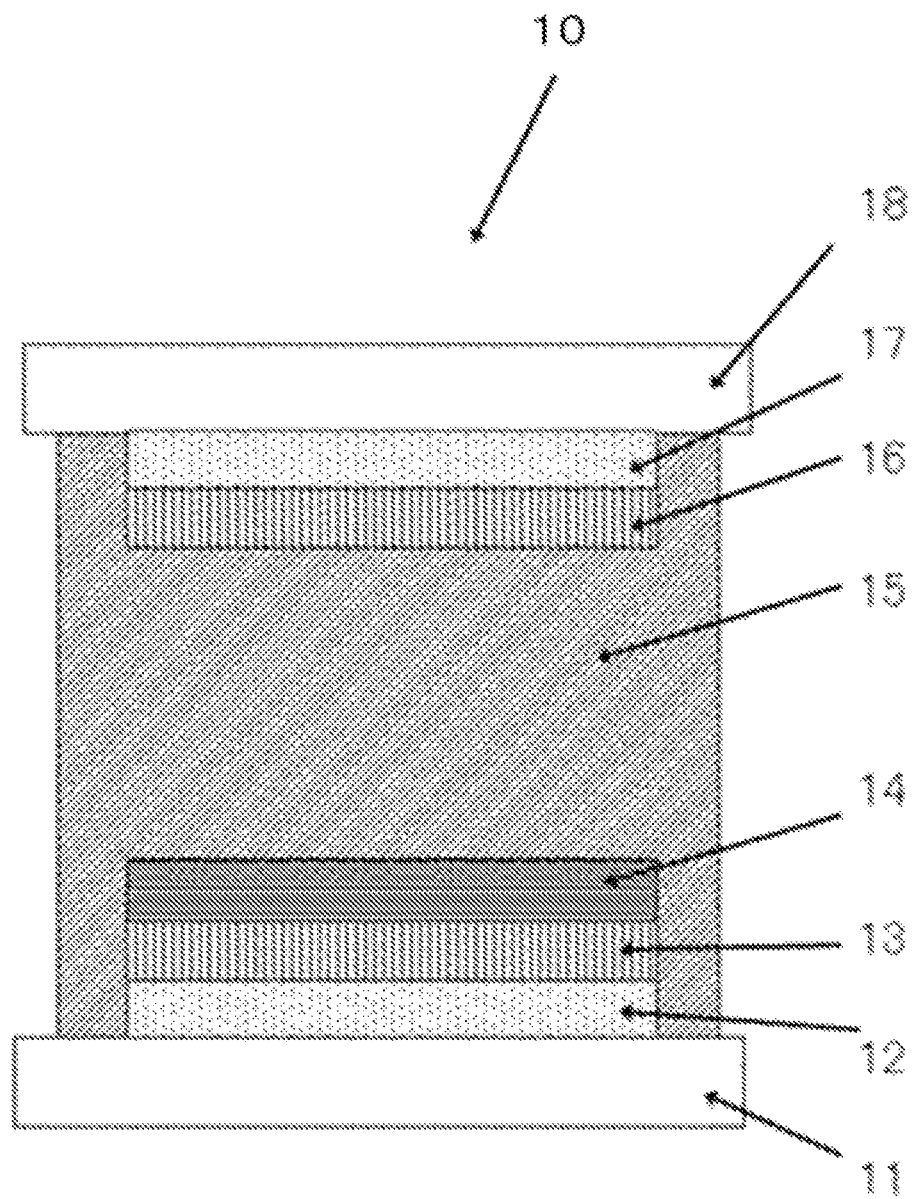

[Fig. 2]
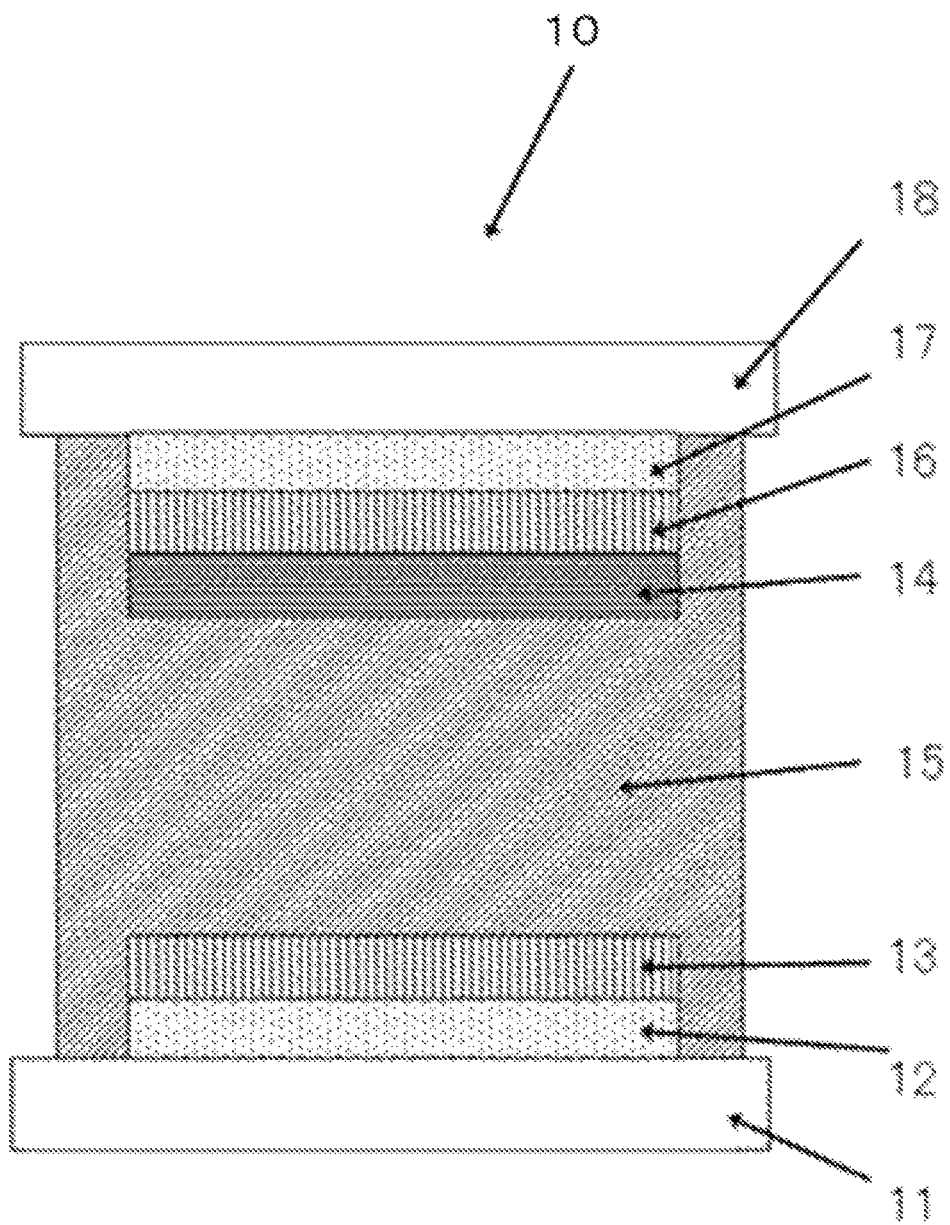

[Fig. 3]
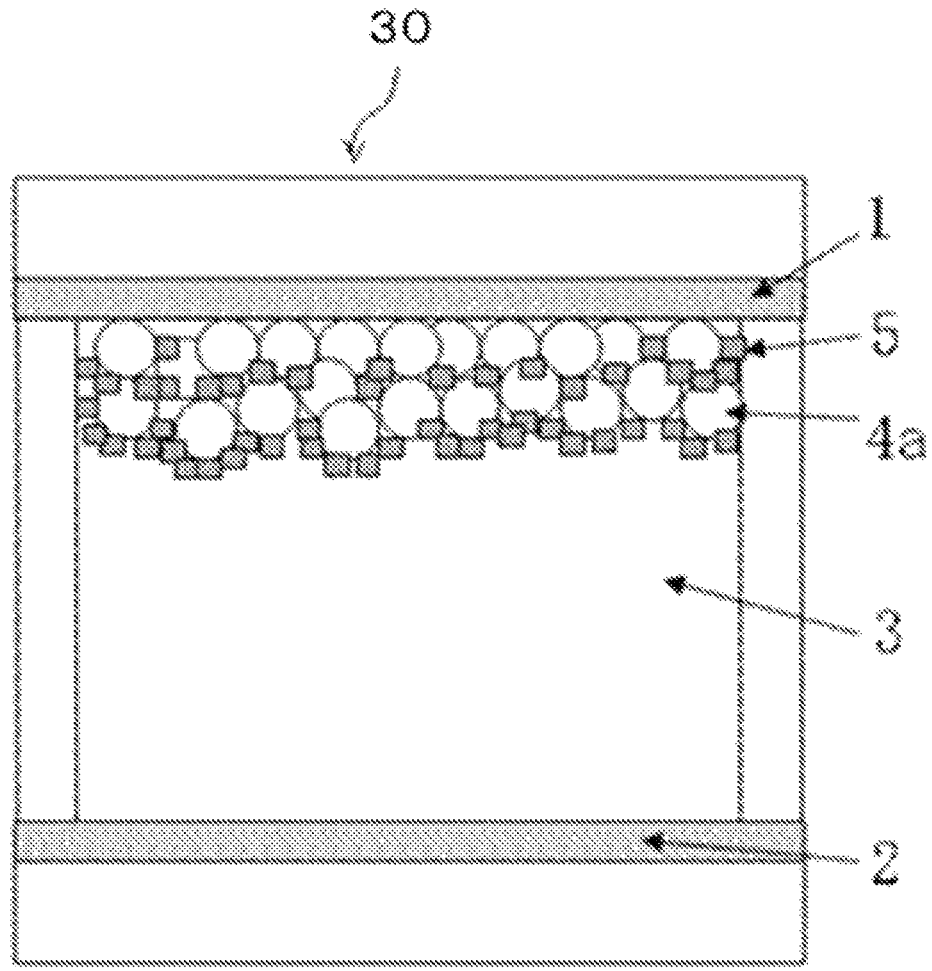
[Fig. 4]
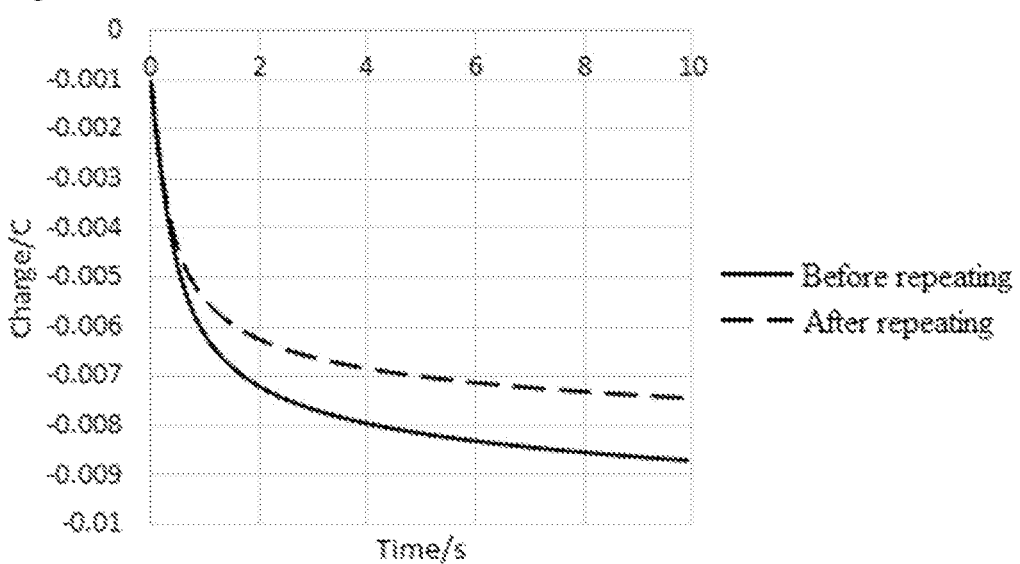

[Fig. 5]
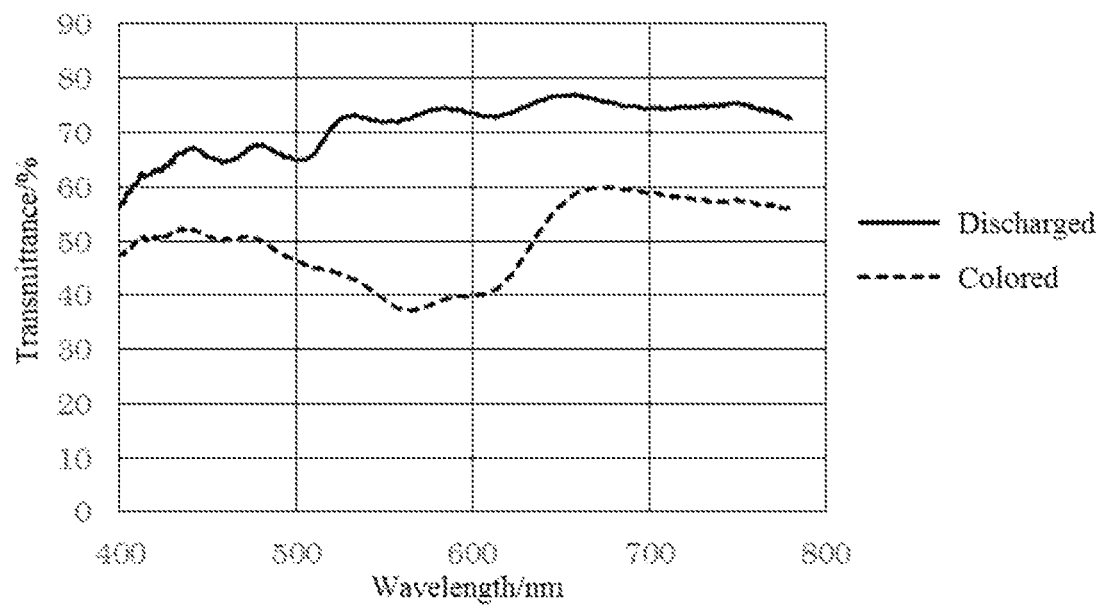
[Fig. 6]
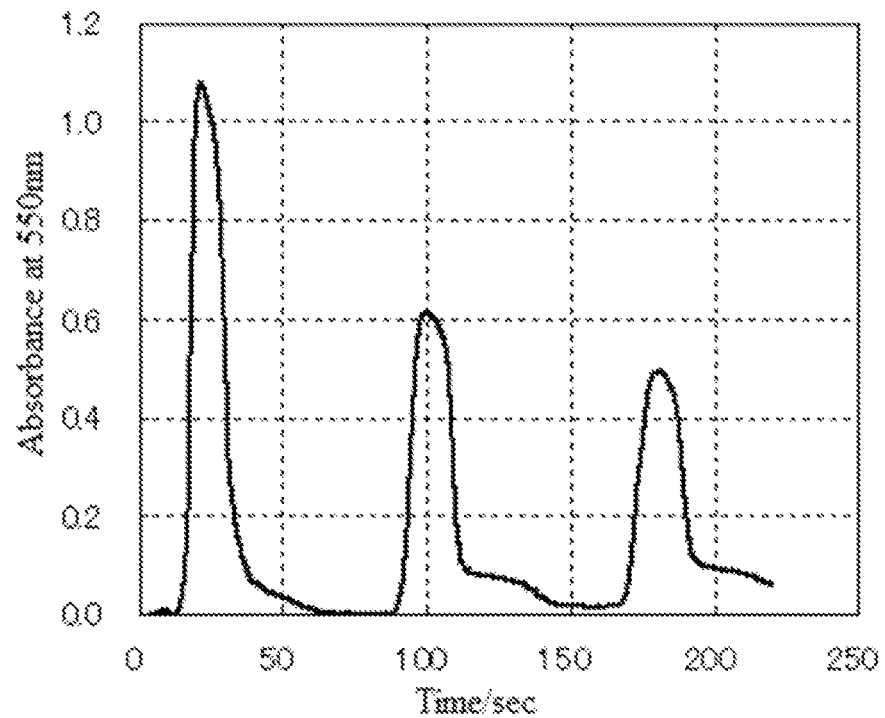

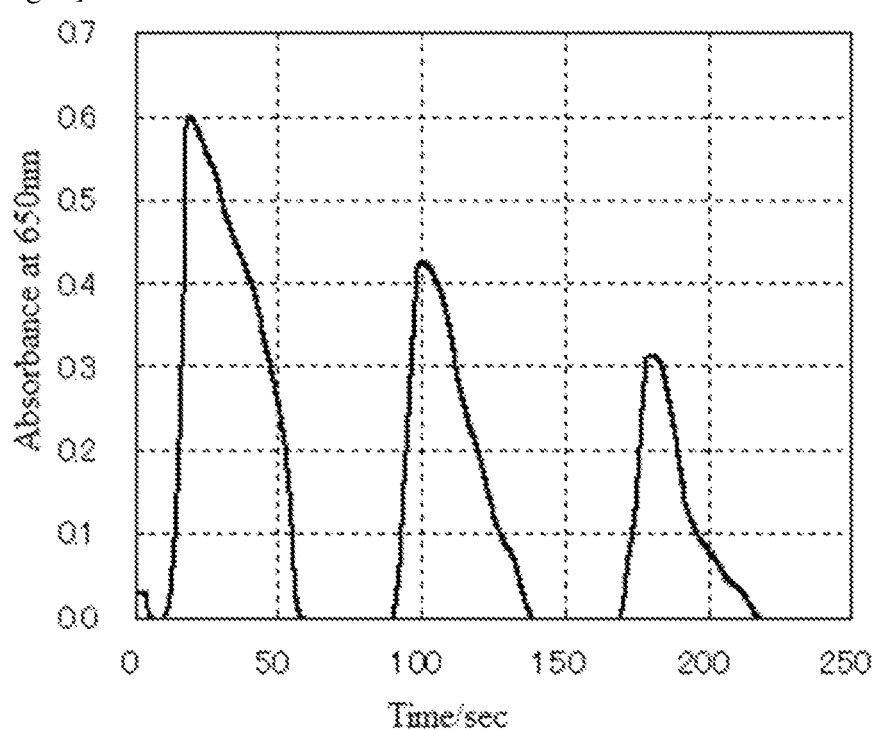
[Fig. 7]

ELECTROCHROMIC COMPOUND, ELECTROCHROMIC COMPOSITION, ELECTROCHROMIC ELEMENT, AND ELECTROCHROMIC DIMMING ELEMENT

CROSS-REFERENCE TO RELATED APPLICATIONS

This application is a National Stage of PCT/JP2016/000680, which was filed on Feb. 9, 2016. This application is based upon and claims the benefit of priority to Japanese Application No. 2015-050266, which was filed on Mar. 13, 2015, and to Japanese Application No. 2015-208313, which was filed on Oct. 22, 2015.

TECHNICAL FIELD

The present invention relates to electrochromic compounds, electrochromic compositions, electrochromic elements, and electrochromic dimming elements.

BACKGROUND ART

Electrochromism is a phenomenon where an oxidation-reduction reaction is reversibly caused to reversibly change a color, as voltage is applied. The electrochromism is typically established between two facing electrodes, and causes oxidation-reduction reactions with a structure where the space between the electrode is filled with an electrolyte layer capable of conducting ions. When a reduction reaction is caused adjacent to one of the two facing electrodes, an oxidation reaction, which is a reverse reaction of the reduction reaction, is caused adjacent to the other electrode.

In the case where a transparent display device is attained using the aforementioned electrochromic element, or a device having a structure where 3 coloring layers, cyan (C), magenta (M), and yellow (Y), are laminated, is produced, it is important that the electrochromic element is formed with materials, which are colorless and transparent.

As for a material that can solve the aforementioned problem, suitable is a viologen compound that is transparent in the neutralized state, and exhibits an electrochromic phenomenon where the compound colors in the reduced state. As a combination with viologen compound, titanium oxide is suitably used. Among various types of titanium oxide, it has been reported that use of titanium oxide particles as particles bearing the electrochromic compound in the laminate structure can maintain a high optical density and high contrast ratio.

As for a material that solves the aforementioned problem, other than the material described above, a polymer obtained by polymerizing an electrochromic composition including a radically polymerizable compound containing tryarylamine, which is transparent in the neutralized state, and exhibits an electrochromic phenomenon where the polymer colors in the reduced state, is effective. It has been reported that use of the compound as an electrochromic material can secure high operation stability, and high lightfastness (for example, see NPL 1).

However, it is preferred that an element be driven with the lower voltage than the voltage as reported in the aforementioned literature. Moreover, it is desired to maintain the higher driving stability to achieve practical use of the electrochromic element.

CITATION LIST

Non Patent Literature

NPL 1: Org. Electron. 2014, 15, 428-434.

SUMMARY OF INVENTION

Technical Problem

The present invention aims to provide an electrochromic compound, which has excellent durability to repetitive use, and is colorless in a discharged state, without having an absorption band in a visible wavelength range, as discharged.

Solution to Problem

As the means for solving the aforementioned problems, the electrochromic compound of the present invention is represented by the following general formula (1).

[Chem. 1]

General Formula (1)

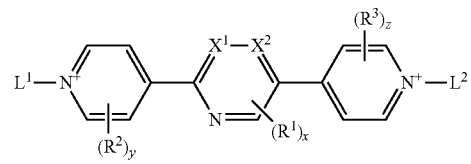

In the general formula (1), $X^1$ and $X^2$ are each independently a carbon atom or a nitrogen atom, $R^1$, $R^2$ and $R^3$ are each independently a halogen atom, a substituted or unsubstituted alkyl group, or a substituted or unsubstituted alkoxy group, x is an integer selected from 0 through 3, y and z are each independently an integer selected from 0 through 4, and at least one of $L^1$ and $L^2$ is a monovalent functional group bonded to a nitrogen atom of a pyridinium ring directly, or via a divalent substituent.

Advantageous Effects of Invention

The present invention can provide an electrochromic compound, which has excellent durability to repetitive use, and is colorless in a discharged state, without having an absorption band in a visible wavelength range, as discharged.

BRIEF DESCRIPTION OF DRAWINGS

FIG. 1 is a schematic view illustrating one example of the electrochromic element of the present invention.

FIG. 2 is a schematic view illustrating another example of the electrochromic element of the present invention.

FIG. 3 is a schematic view illustrating one example of an electrochromic dimming element using the electrochromic compound of the present invention.

FIG. 4 is a graph depicting an evaluation result of the repeating test performed on the electrochromic element of Example 10.

FIG. 5 is a diagram depicting changes in the transmittance spectrums of discharging and charging in Example 10.

FIG. 6 is a diagram depicting a change in the absorption spectrum of Comparative Example 1.

FIG. 7 is a diagram depicting a change in the absorption spectrum of Comparative Example 2.

DESCRIPTION OF EMBODIMENTS (Electrochromic Compound)

An electrochromic compound of the present invention is represented by the following general formula (1).

[Chem. 2]

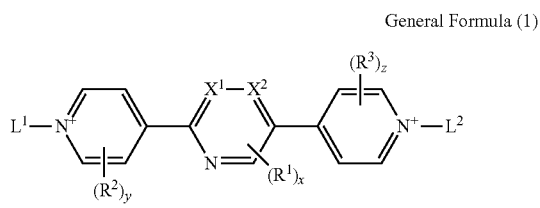

General Formula (1)

In the general formula (1), $X^1$ and $X^2$ are each independently a carbon atom or a nitrogen atom, $R^1$, $R^2$ and $R^3$ are each independently a halogen atom, a substituted or unsubstituted alkyl group, or a substituted or unsubstituted alkoxy group, x is an integer selected from 0 through 3, y and z are each independently an integer selected from 0 through 4, and at least one of $L^1$ and $L^2$ is a monovalent functional group bonded to a nitrogen atom of a pyridinium ring directly, or via a divalent substituent.

Among the structures mentioned above, it is preferred that at least one of $R^1$ to $R^3$, and $L^1$ and $L^2$ contain a functional group capable of directly or indirectly bonding to a hydroxyl group, in view of a structure and general characteristics of a resulting electrochromic element.

Moreover, it is preferred in view of a management of reaction raw materials and a synthesis reaction that at least one of $L^1$ and $L^2$ contain a functional group capable of directly or indirectly bonding to a hydroxyl group.

Furthermore, it is particularly preferred that the functional group capable of directly or indirectly bonding to a hydroxyl group be a phosphonic acid group, a phosphoric acid group, a carboxylic acid group, a silyl group, or a silanol group.

Examples of the halogen atom as any of $R^1$ to $R^3$ in the general formula (1) include a fluorine atom, a chlorine atom, a bromine atom, and an iodine atom. Among them, a fluorine atom is preferable in view of stability.

Examples of the substituted or unsubstituted alkyl group as any of $R^1$ to $R^3$ include a methyl group, an ethyl group, a n-propyl group, an i-propyl group, a t-butyl group, a s-butyl group, a n-butyl group, an i-butyl group, a pentyl group, a hexyl group, a heptyl group, an octyl group, a nonyl group, a decyl group, an undecyl group, a dodecyl group, a 9-heptadecyl group, a 3,7-dimethyloctyl group, a 2-ethylhexyl group, a trifluoromethyl group, a 2-cyanoethyl group, a benzyl group, a 4-chlorobenzyl group, a 4-methylbenzyl group, a cyclopentyl group, a cyclohexyl group, a trifluoromethyl group, a difluoromethyl group, a fluoromethyl group, a pentafluoroethyl group, and a trifluoroethyl group. These alkyl groups may be bonded to each other to form a ring. Moreover, examples of the alkoxy group, and the alkylthio group include an alkoxy group or alkylthio group, prepared by inserting an oxygen atom or sulfur atom into a linking site of the alkyl group.

The electrochromic compound of the present invention represented by the general formula (1) contains a pyridinium structure.

Since the pyridinium structure is a monovalent cation, a counter anion is present in the electrochromic compound of the present invention, which is represented by the general formula (1). The counter anion is appropriately selected depending on the intended purpose without any limitation, provided that the anion stably forms a pair with the cation site of the pyridinium structure. Examples of the anion include Br ion, Cl ion, $ClO_4$ ion, $PF_6$ ion, $BF_4$ ion, and $CF_3SO_3$ ion.

Specific examples of $L^1$ and $L^2$ in the general formula (1) include a functional group directly bonding to a nitrogen atom in a ring, or a monofunctional group indirectly bonding to a nitrogen atom in a ring via a divalent hydrocarbon residue, where the hydrocarbon residue may contain a substituent. Examples of the divalent hydrocarbon residue include an alkylenyl group that may include a substituent, an alkenylenyl group that may include a substituent, and an arylenyl group that may include a substituent. Examples of the substituent of the divalent hydrocarbon residue include an alkyl group, an alkenyl group, an alkynyl group, and an aryl group. At least one of a plurality of L may be a functional group capable of directly or indirectly bonding to a hydroxyl group. For example, the functional group capable of directly or indirectly bonding to a hydroxyl group may be a functional group, which itself has a hydroxyl group, is capable of bonding directly to or indirectly to a nitrogen atom in a ring via the divalent hydrocarbon residue, and is easily changed into a hydroxyl group (e.g., a strong Lewis acid group that can be easily hydrolyzed into a hydroxyl group with moistures).

Specifically, a structure of the functional group capable of directly or indirectly bonding to a hydroxyl group is not particularly limited, provided that the functional group is a functional group that can be directly or indirectly bonded to a hydroxyl group with hydrogen bonding, adsorption, or a chemical reaction. Examples of the functional group capable of directly or indirectly bonding to a hydroxyl group include a phosphonic acid group, a phosphoric acid group, a carboxyl group, a trichlorosilyl group, a trialkoxysilyl group, a monochlorosilyl group, and a monoalkoxysilyl group. The trialkoxysilyl group is preferably a triethoxysilyl group, or a trimethoxysilyl group.

Among the aforementioned functional groups, particularly preferred are a trialkoxysilyl group and phosphonic acid group, which have high bonding forces to the below-mentioned conductive or semiconductive nano structure.

These functional groups capable of directly or indirectly bonding to a hydroxyl group may be arranged at any site in the molecule of the electrochromic compound of the present invention. In view of a freedom in synthesis, the functional group capable of directly or indirectly bonding to a hydroxyl group is preferably arranged at the L site in the general formula (1).

Specific examples of the electrochromic compound of the present invention represented by the general formula (1) are listed below, but the electrochromic compound of the present invention is not limited to the following examples.

TABLE 1

| Structural Formula | Compound No. |
| --- | --- |
| (HO)₂OP—(CH₂)₈—N⁺(pyridyl)—(pyridyl)—(pyridyl)—N⁺—(CH₂)₈—PO(OH)₂, 2 Br⁻ | Electrochromic Compound (1-1) |
| (HO)₂OP—CH₂—C₆H₄—CH₂—N⁺(pyridyl)—(pyridyl)—(pyridyl)—N⁺—CH₂—C₆H₄—CH₂—PO(OH)₂, 2 Br⁻ | Electrochromic Compound (1-2) |
| (HO)₂OP—(CH₂)₈—N⁺(pyridyl)—(pyrazyl)—N⁺—(CH₂)₈—PO(OH)₂, 2 Br⁻ | Electrochromic Compound (1-3) |
| (HO)₂OP—(CH₂)₈—N⁺(pyridyl)—(pyrimidyl)—N⁺—(CH₂)₈—PO(OH)₂, 2 Br⁻ | Electrochromic Compound (1-4) |
| (HO)₂OP—(CH₂)₈—N⁺(pyridyl)—(methylpyridyl)—N⁺—(CH₂)₈—PO(OH)₂, 2 Br⁻ | Electrochromic Compound (1-5) |
| (HO)₂OP—(CH₂)₈—N⁺(pyridyl)—(methylpyridyl)—N⁺—(CH₂)₈—PO(OH)₂, 2 Br⁻ | Electrochromic Compound (1-6) |
| (HO)₂OP—(CH₂)₈—N⁺(pyridyl)—(pyridyl)—N⁺—(CH₂)₈—PO(OH)₂, 2 Br⁻ | Electrochromic Compound (1-7) |

<Electrochromic Compound (1-8)>

[Chem. 3]

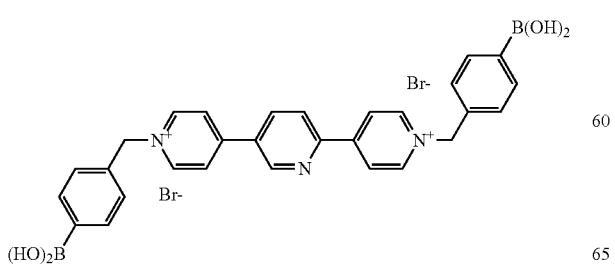

<Electrochromic Compound (1-9)>

[Chem. 4]

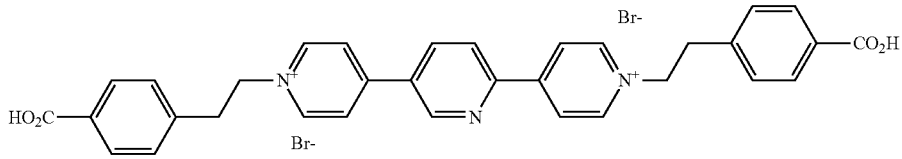

<Production Method of Electrochromic Compound>

A production method of the electroactive compound of the present invention, which is represented by the general formula (1), is specifically described.

The electroactive compound can be obtained, for example, by allowing a nitrogen-containing heteroaromatic ring derivative represented by the following general formula (1a) and a pyridine compound represented by the following general formula (1b) to react through across-coupling reaction in an appropriate solvent using a palladium catalyst or a nickel catalyst. As for the cross-coupling reaction, conventional methods, such as Suzuki-Miyaura cross-coupling, and Stille coupling.

[Chem. 5]

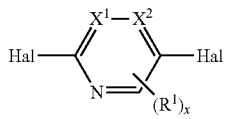

General Formula (1a)

In the general formula (1a), $R^1$ is the same as the aforementioned $R^1$ described above. Hal is a halogen atom, preferably a chlorine atom, a bromine atom, or an iodine atom.

[Chem. 6]

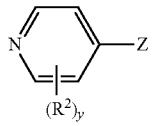

General Formula (1b)

In the general formula (1b), y and $R^2$ are both the same as y and $R^2$ described above. Z is a substituent active for coupling, such as a boronic acid group, a boronic acid ester group, and a trialkylstannyl group.

A compound, in which two halogens represented by the general formula (1a) are substituted with pyridine units represented by the general formula (1b), can be obtained by using the compound represented by the general formula (1b) in the amount of 2 mol or greater relative to the compound represented by the general formula (1a). Moreover, different units each represented by the general formula (1b) can be introduced by performing a reaction in stages.

Subsequently, the compound obtained by the aforementioned reaction is allowed to react with Compound A-B in an appropriate solvent, to thereby synthesize the electrochromic compound of the present invention.

The A is a monovalent group that may contain a functional group selected from the group consisting of an alkyl group, an alkenyl group, an alkynyl group, and an aryl group, and the monovalent group may include a substituent.

The B is preferably a halogen atom, a tosyl group, a mesyl group, or a trifyl group.

The solubility of the compound, or adsorption ability of the compound to bearing particles can be controlled by appropriately changing the substituent A. Moreover, the efficiency of a quaternary chloride reaction of the pyridine ring by appropriately changing the B.

The solvent used for the reaction may be appropriately selected depending on the intended purpose without any limitation, but the solvent is preferably a polarity solvent, more preferably an aprotic polar solvent. Examples of the solvent include acetone, acetonitrile, dimethylformamide, dimethylacctoamide, N-methylpyrrolidone, dioxane, and tetrahydrofuran. These solvents may be used alone or in combination.

As for the purification of the crude product obtained after the reaction, the purification can be performed, specifically, by various purification methods known in the art, such as solvent washing, recrystallization, column chromatography, and reprecipitation.

(Electrochromic Composition)

The electrochromic composition of the present invention includes a conductive or scmiconductivc nanostructure, and the electrochromic compound (the electrochromic compound represented by the general formula (1)) of the present invention, which can be bonded to or adsorbed onto the conductive or scmiconductivc nano structure.

When the electrochromic composition is used in an electrochromic element, the electrochromic composition colors in black, and a resulting electrochromic element has excellent memory properties, specifically, excellent retainability of a colored image.

The conductive or scmiconductivc nano structure is a structure having nano-scale irregularities, such as nano particles, and a nano-porous structure.

In the ease where either of the substituents A contains the functional group capable of directly or indirectly bonding to a hydroxyl group, and the electrochromic compound of the present invention contains a sulfonic acid group, a phosphoric acid group, or a carboxyl group as a bonding or adsorption structure, the electrochromic compound easily forms a composite with the nano structure, to thereby provide an electrochromic composition having excellent coloring image retainability. A plurality of the sulfonic acid groups, phosphoric acid groups, and carboxyl groups may be included in the electrochromic compound. In the case where the electrochromic compound of the present invention include a silyl group or silanol group, moreover, the electrochromic compound is bonded to the nano structure via a siloxane bond, which is a solid bond. Accordingly, a stable electrochromic composition is attained. The siloxane bond is a chemical bond via a silicon atom and an oxygen atom. Moreover, the bonding method and bonding embodiment of the electrochromic composition are not particularly limited, as long as the electrochromic composition has a structure where the electrochromic compound and the nano structure are bonded together with a siloxane bond.

A material for constituting the conductive or semiconductive nano structure is preferably metal oxide in view of transparency and conductivity. Examples of the metal oxide include titanium oxide, zinc oxide, tin oxide, zirconium oxide, cerium oxide, yttrium oxide, boron oxide, magnesium oxide, indium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicic acid, calcium phosphate, and aluminosilicate. These metal oxides may be used alone or in combination.

Among them, preferred in view of electric properties, such as electroconductivity,, or physical properties, such as optical characteristics, are titanium oxide, zinc oxide, tin oxide, zirconium oxide, iron oxide, magnesium oxide, indium oxide, and tungsten oxide. Titanium oxide is particularly preferable in view of a coloring-discharging response speed.

A shape of the metal oxide is appropriately selected depending on the intended purpose without any limitation, but the shape of the metal oxide is preferably metal oxide particles having the average primary particle diameter of 30 nm or smaller. As the average primary particle diameter of the metal oxide is smaller, transmittance of the metal oxide to light is improved more. Accordingly, a shape thereof having a large surface area per unit volume (referred to as "specific surface area" hereinafter) is used.

As the nano structure has a large specific surface area, the electrochromic compound is more efficiently born on the nano structure, leading to an electrochromic clement that realizes excellent coloring-discharging display contrast ratio, and excellent multicolor display. The specific surface area of the nano structure is appropriately selected depending on the intended purpose without any limitation, but the specific surface area of the nano structure is preferably 100 $m^2/g$ or greater.

(Electrochromic Element)

The electrochromic clement of the present invention includes a first support, a first electrode formed on the first support, a first electroactive layer, a second support disposed to face the first support, a second electrode formed on the second support at a side of the first support, a second electroactive layer, and an electrolyte filling between the first electrode and the second electrode. The electrochromic clement of the present invention preferably further includes an insulating porous layer, and may further contain other members, if necessary.

The first electroactive layer contains an electrochromic compound, which colors through a reduction reaction, and is represented by the above general formula (1), and the second electroactive layer contains a charge-storing material.

The aforementioned other members are appropriately selected depending on the intended purpose without any limitation, and examples of the aforementioned other members include an antideterioration layer, and a protective layer.

FIG. 1 is a cross-sectional view illustrating an example of the electrochromic device according to a first embodiment.

With reference to FIG. 1, the electrochromic device contains a first support 11, a first electrode 12 formed on the first support 11, a first electroactive layer 13 disposed to be in contact with the first electrode 12, a second support 18, a second electrode 17 formed on the second support 18, a second electroactive layer 16 disposed to be in contact with the second electrode 17, an insulating porous layer 14, which is disposed between the first electrode 12 and the second electrode 17 to prevent electrical short circuit between the both electrodes, and is formed to be in contact with the first electroactive layer 13 and the second electroactive layer 16, and an electrolyte 15 configured to perform ion conduction between the electrodes.

Note that, the insulating porous layer 14 configured to prevent electrical short circuit between the both electrodes may be formed on a surface of the second electroactive layer 16, as illustrated in FIG. 2. The constitutional elements are specifically described hereinafter.

<First Support, Second Support>

The first support 11 has a function of supporting the first electrode 12, the first electroactive layer 13, and the insulating porous layer 14. The second support 18 has a function of supporting the second electrode 17, the second electroactive layer 16, and the insulating porous layer.

As for the support, an organic material or inorganic material known in the art can be used as it is, provided that the material is a transparent material capable of supporting the aforementioned layers.

As for the substrate, a glass substrate, such as non-alkali glass, borosilicate glass, float glass, and soda-lime glass, can be used. Moreover, a resin substrate, such as of a polycarbonate resin, an acrylic resin, polyethylene, polyvinyl chloride, polyester, an epoxy resin, a melamine resin, a phenol resin, a polyurethane resin, and a polyimide resin, may be used as the support. Moreover, a surface of the support may be coated with a transparent insulating layer, or an antireflection layer, in order to enhance water- vapor barrier properties, gas barrier properties, and visibility. A shape of the support is appropriately selected depending on the intended purpose without any limitation, and the shape thereof may be a rectangle or a circle, and may have a flat surface, or a spherical surface structure, such as a lens.

<First Electrode and Second Electrode>

As in the electrochromic element, the first electrode 12 and the second electrode 17 are not particularly limited, as long as either or both of the first electrode 12 and the second electrode 17 is or are transparent. Moreover, materials of the first electrode 12 and the second electrode 17 are not particularly limited, as long as the materials are conductive materials. Use of the aforementioned electrodes can enhance coloring contrast.

As for the transparent conductive material, for example, an inorganic material, such as tin-doped indium oxide (abbrev. ITO), fluorine-doped tin oxide (abbrev. FTO), and antimony-doped tin oxide (abbrev. ATO), can be used. Among them, the transparent conductive material is preferably an inorganic material containing at least one selected from the group consisting of indium oxide (referred to as In oxide hereinafter), tin oxide (referred to as Sn oxide hereinafter), and zinc oxide (referred to as Zn oxide hereinafter).

The In oxide, Sn oxide and Zn oxide are materials, which can be easily formed into a film by sputtering, and give excellent transparency and electroconductivity. Among them particularly preferred are InSnO, GaZnO, SnO, $In_2O_3$, and ZnO.

Moreover, an electrode, which is prepared by forming transparent carbon nanotube, or a highly-conductive non-transparent material, such as Au, Ag, Pt, and Cu, into a fine network, to improve conductivity with maintaining transparency, may be used.

A thickness of each of the first electrode 12 and the second electrode 17 is adjusted to attain sufficient electric resistance value required for oxidation-reduction reactions of the electrochromic layer. In the case where ITO is used as a material of each of the first electrode 12 and the second electrode 17, a thickness of each of the first electrode 12 and the second electrode 17 is preferably 50 nm or greater but 500 nm or less.

Examples of a production method of each of the first electrode 12 and the second electrode 17 include vacuum vapor deposition, sputtering, and ion plating.

The production method is appropriately selected depending on the intended purpose without any limitation, provided that a material of each of the first electrode 12 and the second electrode 17 can be applied through coating, to thereby form a layer. As for the coating method, for example, various coating or printing methods, such as spin coating, casting, microgravure coating, gravure coating, bar coating, roll coating, wire- bar coating, dip coating, slit coating, capillary coating, spray coating, nozzle coating, gravure printing, screen printing, flexographic printing, offset printing, reverse printing, and inkjet printing, can be used. In the case where transparency is not important, a metal plate, such as titanium, and zinc, can be also used as the electrode.

<First Electroactive Layer>

The electrochromic compound represented by the general formula (1) can be used for the first electroactive layer 13. Use of the certain heterocyclic compound in the first electroactive layer can be realize low voltage driving, and achieve operation stability.

In combination with the electroactive compound, titanium oxide is suitably used. Among various types of titanium oxide, titanium oxide particles are preferably used as bearing particles of the electroactive compound, in order to secure a high optical density and high contrast ratio.

In the electrochromic element, the electrochromic compound colors and discharges through oxidation and reduction reactions only at a surface of the electrode.

A mixture of the electrochromic compound, where $L^1$ and $L^2$ in the general formula (1) are both a monovalent functional group capable of directly or indirectly via a divalent substituent bonding to a nitrogen atom of a pyridinium ring, and the electrochromic compound, where $L^1$ or $L^2$ in the general formula (1) is a monovalent functional group capable of directly or indirectly via a divalent substituent bonding to a nitrogen atom of a pyridinium ring, may be used in the first electroactive layer.

The electrochromic compound can change an absorption spectrum thereof through the presence of substituents at $L^1$ and $L^2$ in the general formula (1). Accordingly, an absorption band, such as color tone, can be adjusted by blending a dye having substituents at both $L^1$ and $L^2$ and a dye having a substituent at cither $L^1$ or $L^2$ in the first electroactive layer, and adjusting the abundance ratio of each dye.

Examples of a formation method of the first electroactive layer include vacuum vapor deposition, sputtering, and ion plating. In the case where a material of the first electroactive layer is suitable for coating to form a film, for example, various coating or printing methods, such as spin coating, casting, microgravure coating, gravure coating, bar coating, roll coating, wire-bar coating, dip coating, slit coating, capillary coating, spray coating, nozzle coating, gravure printing, screen printing, flexographic printing, offset printing, reverse printing, and inkjet printing, can be used.

<Second Electroactive Layer>

The second electroactive layer contains a charge-storing material.

The charge-storing material is a material, which itself can store electric charge, and is used in the second electrochromic layer as a material that can store electric charge.

In the case where a metal plate, such as titanium, and zinc, is used as the support, moreover, the second electroactive layer also functions as the second electrode 17.

Examples of the charge-storing material include conductive or semiconductive hearing particles, a compound including a radical, and a compound including triarylamine.

A material of the conductive or semiconductive bearing particles is not particularly limited, as long as the material is a material which is configured to, as the conductive or semiconductive bearing particles, prevent corrosion of the counter electrode due to irreversible an oxidation or reduction reaction. Examples of the material include various materials, such as an insulating material (e.g., $Al_2O_3$, $SiO_2$, and an insulating material containing any of the foregoing materials), a semiconductive material (e.g., zinc oxide, titanium oxide, a semiconductive material containing any of the foregoing materials), and an organic material (e.g., polyimide).

As for the material, for example, it has been known that conductive or semiconductive metal oxide particles (e.g., antimony-doped in oxide, nickel oxide) are fixed on the counter electrode with a binder, such as an acrylic binder, an alkyd binder, an isocyanate binder, an urethane binder, an epoxy binder, and a phenol binder.

In order to improve driving stability, a material exhibiting an oxidation reaction (oxidation reactive material), which is a reverse reaction of a reaction of the electrochromic compound contained in the first electroactive layer 13, is more preferably used than the conductive or semiconductive bearing particles. In the electrochromic element, the first electrochromic layer and the second electrochromic layer carry out opposite reactions to each other at the same time. In the present research, a material colors through a reduction reaction is used as the first electrochromic layer. Accordingly, a material that is oxidation reactive, which is a reverse reaction to the reaction of the first electrochromic layer, is used for the second electrochromic layer. As a result, the charge is efficiently exchanged, the driving voltage is reduced, and stable driving can be achieved.

Examples of the oxidation reactive material include a compound including a functional group containing radical.

Examples of the compound including a functional group containing radical include materials prepared by substituting 2,2,6,6-tetramethylpiperidine-1-oxyl (=TEMPO), 2,2,5,5-tetramethylpyrrolidine-1-oxyl (=PROXYL), or 4,4,5,5-tetramethylimidazoline-1-oxyl-3-oxide (=nitronyl nitroxide). Moreover, the compound including a functional group containing radical may be a compound that is turned into a precursor of a radical compound, i.e., a compound turned into a radical state through oxidation or reduction, such as an electrode reaction. In this case, a radical side is generated through an oxidation or reduction reaction, such as an electrode reaction, after producing a gel.

Other examples of the oxidation reactive compound include an azobenzene compound, a tetralhiafulvalene compound, a triphenylmethane compound, a triphenylamine compound, and a leuco dye. Among them, a radically polymerizable compound including a triarylamine structure site is particularly preferable in view of high driving durability and lightfastness.

It is preferred that the second electroactive layer contain an oxidation-reactive material including a triarylamine structure site, where the oxidation-reactive material including a triarylamine structure site contains a cross-linked product obtained by crosslinking a radically polymerizable compound including a triarylamine structure site, and a polymerizable composition including another radically polymerizable compound different from the radically polymerizable compound including a triarylamine structure site.

It is preferred that the radically polymerizable compound including a triarylamine structure site, or the another radically polymerizable compound different from the radically polymerizable compound including a triarylamine structure site contain two or more radically polymerizable functional groups.

Examples of the radically polymerizable compound including a triarylamine structure site include a compound represented by the following general formula (2).

[Chem.7]

$$A_n\text{-}B_m \qquad \text{General Formula (2)}$$

Note that, m is 0 when n=2 and m is 0 or 1 when n=1, and at least one of A and B contains a radically polymerizable functional group.

A is a structure represented by the following general formula (3), and is bonded to B at a site selected from $R_1$ through $R_{15}$.

B is a structure represented by the following general formula (4), and is bonded to A at a site selected from $R_{16}$ through $R_{21}$.

[Chem. 8]

General Formula (3)

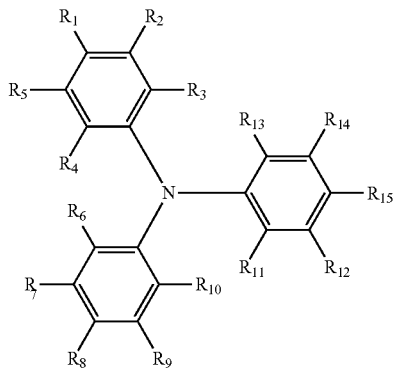

[Chem. 9]

General Formula (4)

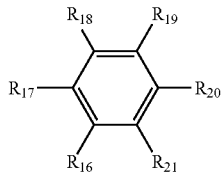

In the general formulae (3) and (4), $R_1$ to $R_{21}$ are monovalent organic groups, which may be identical or different, and at least one of the monovalent organic groups is a radically polymerizable functional group.

—Monovalent Organic Groups—

Examples of each of the monovalent organic group include a hydrogen atom, a halogen atom, a hydroxyl group, a nitro group, a cyano group, a carboxyl group, an alkoxycarbonyl group that may include a substituent, an aryloxycarbonyl group that may include a substituent, an alkylcarbonyl group that may include a substituent, an aryl carbonyl group that may include a substituent, an amide group, a monoalkylaminocarbonyl group that may include a substituent, an alkylaminocarbonyl group that may include a substituent, a monoaryl aminocarbonyl group that may include a substituent, a diarylaminocarbonyl group that may include a substituent, a sulfonic acid group, an alkoxysulfonyl group that may include a substituent, an aryloxy sulfonyl group that may include a substituent, an alkyl sulfonyl group that may include a substituent, an aryl sulfonyl group that may include a substituent, a sulfone amide group, a monoalkylaminosulfonyl group that may include a substituent, a dialkylaminosulfonyl group that may include a substituent, a monoarylaminosulfonyl group that may include a substituent, a diarylaminosulfonyl group that may include a substituent, an amino group, a monoalkylamino group that may include a substituent, a dialkylamino group that may include a substituent, an alkyl group that may include a substituent, an alkenyl group that may include a substituent, an alkynyl group that may include a substituent, an aryl group that may include a substituent, an alkoxy group that may include a substituent, an aryloxy group that may include a substituent, an alkyl thio group that may include a substituent, an aryl thio group that may include a substituent, and a heterocyclic group that may include a substituent. Among them, particularly preferred in view of stable operation and lightfastness are an alkyl group, an alkoxyl group, a hydrogen atom, an aryl group, an aryloxy group, a halogen group, an alkenyl group, and an alkynyl group.

Examples of the halogen atom include a fluorine atom, a chlorine atom, a bromine atom, and an iodine atom.

Examples of the alkyl group include a methyl group, an ethyl group, a propyl group, and a butyl group.

Examples of the aryl group include a phenyl group, and a naphthyl group.

Examples of the aralkyl group include a benzyl group, a phenethyl group, and a naphthylmethyl group.

Examples of the alkoxy group include a methoxy group, an ethoxy group, and a propoxy group.

Examples of the aryloxy group include a phenoxy group, a 1-naphthyloxy group, a 2-naphthyloxy group, a 4-methoxyphenoxy group, and a 4-methylphenoxy group.

Examples of the heterocyclic group include carbazole, dibenzofuran, dibenzothiophene, oxadiazole, and thiadiazole.

Examples of a substituent further substituted with the substituent include a halogen atom, a nitro group, a cyano group, an alkyl group (e.g., a methyl group, and an ethyl group), an alkoxy group (e.g., a methoxy group, and an ethoxy group), an aryloxy group (e.g., a phenoxy group), an aryl group (e.g., a phenyl group, and a naphthyl group), a benzyl group, and an aralkyl group (e.g., a phenethyl group).

—Radically Polymerizable Functional Group—

The radically polymerizable functional group is not particularly limited as long as the radically polymerizable functional group includes a carbon double bond (C=C), and is a group that is radically polymerizable.

Examples of the radically polymerizable functional group include a 1-substituted ethylene functional group, and 1,1-substituted ethylene functional group, which are described below.

(1) 1-Substituted Ethylene Functional Group

Examples of the 1-substituted ethylene functional group include a functional group represented by the following general formula (i).

[Chem.10]

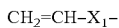

$CH_2=CH-X_1-$     General Formula (i)

In the general formula (i), $X_1$ is an arylene group that may include a substituent, an alkenylene group that may include a substituent, a group represented by -CO-, a group represented by -COO-, a group represented by -CON($R_{100}$)- [$R_{100}$ is a hydrogen atom, an alkyl group, an aralkyl group, or an aryl groupJ, or a group represented by -S-.

Examples of the arylene group in the general formula (i) include a phenylene group that may include a substituent, and a naphthylene group.

Examples of the alkenylene group include an ethenylene group, a propenylene group, and a butenylene group.

Examples of the alkyl group include a methyl group, and an ethyl group.

Examples of the aralkyl group include a benzyl group, a naphthylmethyl group, and a phenethyl group.

Examples of the aryl group include a phenyl group, and a naphthyl group.

Specific examples of the radically polymerizable functional group represented by the general formula (i) include a vinyl group, a styryl group, a 2-methyl-1,3-butadienyl group, a vinylcarbonyl group, an acryloyloxy group, an acryloylamide group, and a vinyl thio ether group.

(2) 1,1-Substituted Ethylene Functional Group

Examples of the 1,1-substituted ethylene functional group include a functional group represented by the following general formula (ii).

[Chem. 11]

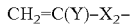

$CH_2=C(Y)-X_2-$     General Formula (ii)

In the general formula (ii), Y is an alkyl group that may include a substituent, an aralkyl group that may include a substituent, an aryl group that may include a substituent, a halogen atom, a cyano group, a nitro group, an alkoxy group, a group represented by -$COOR_{101}$ [$R_{101}$ is a hydrogen atom, an alkyl group that may include a substituent, an aralkyl group that may include a substituent, an aryl group that may include a substituent, or a group represented by $CONR_{102}R_{103}$ ($R_{102}$ and $R_{103}$ are each a hydrogen atom, an alkyl group that may include a substituent, an aralkyl group that may include a substituent, or an aryl group that may contain a substituent, and $R_{102}$ and $R_{103}$ may be identical or different)]. Moreover, $X_2$ is a substituent or single bond identical to $X_1$, in the general formula (i), or an alkylene group, provided that at least one of Y and $X_2$ is an oxy carbonyl group, a cyano group, an alkenylene group, or an aromatic ring.

Examples of the aryl group in the general formula (ii) include a phenyl group, and a naphthyl group.

Examples of the alkyl group include a methyl group, and an ethyl group.

Examples of the alkoxy group include a methoxy group, and an ethoxy group.

Examples of the aralkyl group include a benzyl group, a naphthymethyl group, and a phenethyl group.

Specific examples of the radically polymerizable functional group represented by the general formula (ii) include an a-chlorinated acryloyloxy group, a methacryloyloxy group, an α-cyanoethylene group, an α-cyanoacryloyloxy group, an α-cyanophenylene group, and a methacryloylamino group.

Note that, examples of a substituent further substituting the substituents in $X_1$, $X_2$, and Y include a halogen atom, a nitro group, a cyano group, an alkyl group (e.g., a methyl group, and an ethyl group), an alkoxy group (e.g., a methoxy group, and an ethoxy group), an aryloxy group (e.g., a phenoxy group), an aryl group (e.g., a phenyl group, and a naphthyl group), and an aralkyl group (e.g., a benzyl group, and a phenethyl group).

Among the aforementioned radically polymerizable functional groups, particularly preferred are an acryloyloxy group, and a methacryloyloxy group.

Examples of the radically polymerizable compound including a triarylamine structure site include compounds containing skeletons represented by the following general formulae (2-1) to (2-3).

[Chem. 12]

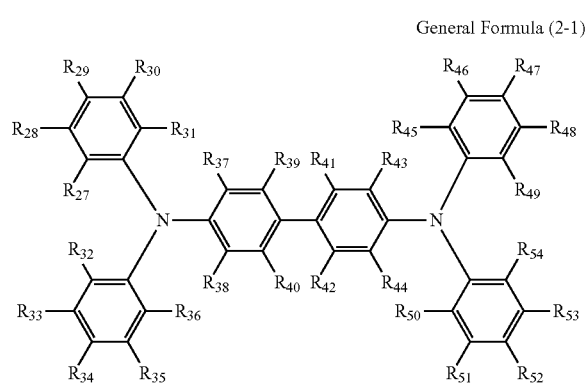

General Formula (2-1)

[Chem. 13]

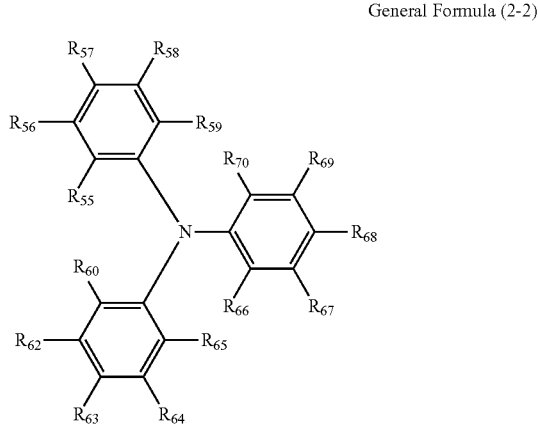

General Formula (2-2)

-continued

[Chem. 14]

General Formula (2-3)

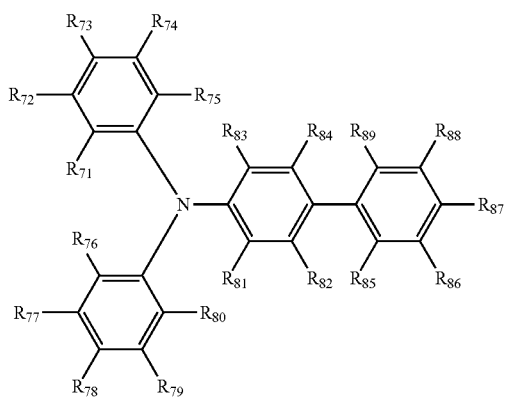

In the general formulae (2-1) (o (2-3), $R_{27}$ through $R_{89}$ are monovalent organic groups, which may he identical or different.

<<Another Radically Polymerizable Compound>>

The aforementioned another radically polymerizable compound is a compound including at least one radically polymerizable functional group, which is different from the radically polymerizable compound including triarylamine.

Examples of the aforementioned another radically polymerizable compound include a monofunctional radically polymerizable compound, a bifunctional radically polymerizable compound, a trifunctional or higher radically polymerizable compound, a functional monomer, and a radically polymerizable oligomer. Among them, a bi-functional or higher radically polymerizable compound is particularly preferable. The radically polymerizable functional group in the aforementioned another radically polymerizable compound is identical to the radically polymerizable functional group contained in the radically polymerizable compound including triarylamine. Among the examples listed as the radically polymerizable functional group, an acryloyloxy group, and a methacryloyloxy group are particularly preferable.

The electroactive compound including an oxidation-coloring compound is present on the first electrode, but such the electroactive compound is preferably used in any state, as long as the electroactive compound is compatible with the electrolyte. For example, the electroactive compound can be present on the first electrode, as it is as a low molecular weight compound. For example, the electroactive compound is present in a state where the electroactive compound is cured with a photo crosslinking group, such as acrylate, and methacrylate. Note that, the electrochromic compound may be present in the state where the electroactive compound is adsorbed on bearing particles, or conductive particles.

Examples of a formation method of the second electroactive layer include vacuum vapor deposition, sputtering, and ion plating. In the case where a material of the second electroactive layer is suitable for coating to form a film, for example, various coating or printing methods, such as spin coating, casting, microgravure coating, gravure coating, bar coating, roll coating, wire-bar coating, dip coating, slit coating, capillary coating, spray coating, nozzle coating, gravure printing, screen printing, flexographic printing, offset printing, reverse printing, and inkjet printing, can be used.

<Insulating Porous Layer>

The insulating porous layer 14 has a function of retaining the electrolyte 15, as well as separating the first electrode 12 and the second electrode 17 from each other to electrically insulate between the first electrode 12 and the second electrode 17.

A material of the insulating porous layer 14 is not particularly limited, as long as the material is porous. The material of the insulating porous layer 14 is preferably an organic or inorganic material, which has high insulating properties and durability, and excellent film formability, or a composite of the organic material and the inorganic material.

As for a formation method of the insulating porous layer 14, a sintering method (a method where polymer particles or inorganic particles are added to a binder to partially fuse the particles to utilize pores generated between the particles), or an extraction method (a method where, after forming a constituting layer with an organic or inorganic material soluble to a solvent, and a binder insoluble to the solvent, the organic or inorganic material is dissolved with the solvent to obtain pores) can be used.

As for the formation method of the insulating porous layer 14, usable methods are a foaming method where a high-molecular-weight polymer is foamed by heating or degassing, a phase transformation method where a mixture of high-molecular-weight compounds are phase-separated by operating a good solvent and a poor solvent, and a radiation method where pores are formed by applying various radial rays. Specific examples of the insulating porous layer include a polymer-particle mixture film containing metal oxide particles (e.g.. $SiO_2$ particles, and $Al_2O_3$ particles) and a polymer binder, a porous organic film (e.g., a polyurethane resin, and a polyethylene resin), and an inorganic insulating material film formed into a porous film. A thickness of the insulating porous layer 14 is appropriately selected depending on the intended purpose without any limitation, but the thickness of the insulating porous layer 14 is preferably in a range of from 0.5 μm through 3 μm.

As for a formation method of the insulating porous layer 14, vacuum vapor deposition, sputtering, or ion plating can be used. In the case where a material of the insulating porous layer 14 is suitable for coating to form a film, for example, various coating or printing methods, such as spin coating, casting, microgravure coating, gravure coating, bar coating, roll coating, wire-bar coating, dip coating, slit coating, capillary coating, spray coating, nozzle coating, gravure printing, screen printing, flexographic printing, offset printing, reverse printing, and inkjet printing, can be used.

<Electrolyte Layer>

The electrolyte layer 15 is disposed to fill between the first electrode 12 and the second electrode 17. and is disposed to be in contact with the first electroactive layer 13 and the second electroactive layer 16.

As for an electrolyte used in the electrolyte layer 15, for example, an inorganic ionic salt (e.g., alkali metal salt, and alkaline earth metal salt), a quaternary ammonium salt, an acid supporting electrolyte, or a base supporting electrolyte can be used. Specific examples of the supporting electrolyte include $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$.

The ionic liquid is not particularly limited, as long as the ionic liquid is a material typically researched or reported.

Particularly, an organic ionic liquid has a molecular structure which is present as a liquid in a wide temperature range including room temperature.

As for the molecular structure, examples of the cationic component include: a imidazole derivative salt, such as N,N-dimethylimidazole salt, N,N-methylethylimidazole salt, and N,N-methylpropylimidazole salt; an aromatic (e.g., a pyridinium derivative) salt, such as N,N-dimethylpyridinium salt, and N,N-methylpropylpyridinium salt; and an aliphatic quaternary ammonium (e.g., tetraalkyl ammonium) compound, such as trimethylpropyl ammonium salt, trimethylhexyl ammonium salt, and triethylhexyl ammonium salt.

The anionic component in the molecular structure is preferably a fluorine-containing compound in view of stability in the atmosphere. Examples of the anionic component include $BF_4$, $CF_3SO_3$, $PF_4$, and $(CF_3SO_2)_2N$. The ionic liquid prepared with a combination of any of the aforementioned cationic components and any of the aforementioned anionic components can be used.

Examples of the solvent include propylene carbonate, acetonitrile, γ-butyrolactone, ethylene carbonate, sulfolane, dioxolane, tetrahydrofuran, 2-methyltetrahydrofuran, dimethylsulfoxide, 1,2-dimethoxyethane, 1,2-ethoxymethoxyethane, polyethylene glycol, and alcohol. These solvents may be used alone, or in combination.

The electrolyte layer 15 is not necessarily a low-viscous liquid, and can be in a various state, such as a gel, a cross-linked polymer, or a liquid dispersion. A strength and reliability of an electroactive element can be improved by forming the electrolyte layer 15 in the gel or solid state.

As for a method for solidifying, it is preferred that an electrolyte and a solvent be retained in a polymer resin. As a result, high ion conductivity and solid strength can be attained.

Moreover, it is preferred that a photocurable resin be used as the polymer resin. Use of the photocurable resin can achieve production of an element at a lower temperature and shorter period compared to a method where a thin film is formed by heat polymerization, or evaporating the solvent.

A thickness of the electrolyte layer 15 is appropriately selected depending on the intended purpose without any limitation, but the thickness of the electrolyte layer 15 is preferably in a range of from 100 nm through 10 μm.

As for a production method of the electroactive device 10, the electrochromic device 10 can be produced by providing a first support 11, on which a first electrode 12, a first electroactive layer 13, and an insulating porous layer 14 are sequentially formed, and a second support 18, on which a second electrode 17, and a second electroactive layer 16 are sequentially formed, and bonding the first electrode 12 and the second electrode 17 together via an electrolyte layer 15. In the case where the electrolyte layer 15 can be cured by light or heat, the electrolyte layer 15 can be cured after bonding. Moreover, the insulating porous layer may be formed on the first electroactive layer 13, or formed on the second electroactive layer 16, or produced by blending with the electrolyte 15.

Examples of a material constituting the display substrate, to which the first electrode (the display clement in the example of FIG. 1) is disposed, include glass, and plastic. In the case where a plastic film is used as the display substrate, a light and flexible display clement can be produced.

As for the second electrode (the counter electrode in the example of FIG. 1), a transparent conductive film (e.g., ITO, FTO, and zinc oxide), a conductive metal film (e.g., zinc, and platinum), or carbon is used. The counter electrode is typically formed on the counter substrate. The counter substrate is preferably a glass plate, or a plastic film. In the case where a metal plate, such as titanium, and zinc is used as the counter electrode, moreover, the counter electrode also functions as the substrate.

(Electrochromic Dimming Element)

The electrochromic dimming clement of the present invention includes a first support, a first electrode formed on the support, a first electroactive layer, a second support disposed to face the first support, a second electrode formed on the second support at a side of the first support, a second electroactive layer, and an electrolyte filling between the first electrode and the second electrode. The electrochromic dimming clement of the present invention may further contain other members.

The first electroactive layer contains an electrochromic compound, which colors through a reduction reaction, and is represented by the following general formula (1), and the second electroactive layer contains a charge-storing material.

Moreover, members constituting the electrochromic dimming element are transparent to light.

The phrase "transparent to light" means that the average value of light transmittance in visible light range (from 400 nm through 700 nm) is 80% or greater.

The average value of the light transmittance is a value determined by attaining values of transmittance in the visible light range (from 400 nm through 700 nm) per 1nm, and calculating the arithmetical means of the values.

For example, the light transmittance can be measured by means of a spectrophotometer (U-33000 spectrophotometer, manufactured by Hitachi, Ltd.).

Examples of the members constituting the electrochromic dimming element include electrodes, an electrochromic layer, an electrolyte layer, supports, an insulating porous layer, an antideterioration layer, and a protective layer.

The aforementioned other members are appropriately selected depending on the intended purpose without any limitation, and examples of the aforementioned other members include an insulating porous layer, an antideterioration layer, and a protective layer.

FIG. 3 is a schematic view illustrating one example of an electrochromic dimming clement using the electrochromic compound of the present invention. The electrochromic dimming element 30 includes a display electrode 1, a counter electrode 2 disposed to face the display electrode 1 with a gap, an electrolyte 3 disposed between the both electrodes (the display electrode 1 and the counter electrode 2), and a display layer 5, which is disposed at a surface of the display electrode 1, and contains at least the electrochromic composition 4a of the present invention.

As for the electrochromic compound in the electrochromic composition of the present invention, an electrochromic compound including, in a molecular structure thereof, a functional group (adsorption group) capable of directly or indirectly bonding to a hydroxyl group, so-called a linking group, is used. The linking group is bonded to the conductive or scmiconductivc nano structure, to thereby form an electrochromic composition. Then, the electrochromic composition is disposed on the display electrode 1 in the form of a layer, to thereby form the display layer 5.

Constituting materials used in the electrochromic dimming element 30 according to the embodiment of the present invention are described hereinafter.

As for a material constituting the display electrode 1, a transparent conductive substrate is preferably used. The transparent conductive substrate is preferably a glass plate or a plastic film, which is coated with a transparent conductive film.

The transparent conductive film material is not particularly limited, as long as the transparent conductive material is a material having electroconductivity, but a transparent conductive material that is transparent and has excellent conductivity is used as the transparent conductive material, as it is necessary to secure light trans- mittance. Use of the aforementioned material can enhance visibility of color to be colored.

Examples of the transparent conductive material include tin-doped indium oxide (abbrev. ITO), fluorine-doped tin oxide (abbrev. FTO), and antimony-doped tin oxide (abbrev. ATO). Among them, the transparent conductive material is preferably an inorganic material containing one selected from the group consisting of indium oxide (referred to as In oxide hereinafter), tin oxide (referred to as Sn oxide hereinafter), and zinc oxide (referred to as Zn oxide hereinafter). The In oxide, Sn oxide and Zn oxide are materials, which can be easily formed into a film by sputtering, and give excellent transparency and electroconductivity. Among them, preferred are InSnO, GaZnO, SnO, $In_2O_3$, and ZnO.

Examples of a material constituting a display substrate (with no numeral reference indicated) to which the display electrode 1 is disposed include glass, and plastic. In the case where a plastic film is used as the display substrate, a light and flexible display element can be produced.

Similar to the display electrode 1, a transparent conductive substrate is used as the counter electrode 2. The transparent conductive substrate is preferably a glass plate or a plastic film, which is coated with a transparent conductive film.

The transparent conductive film material is not particularly limited, as long as the transparent conductive material is a material having electroconductivity, but a transparent conductive material that is transparent and has excellent conductivity is used as the transparent conductive material, as it is necessary to secure light transmittance. Use of the aforementioned material can enhance visibility of color to be colored. Examples of the transparent conductive material include tin-doped indium oxide (abbrev. ITO), fluorine-doped tin oxide (abbrev. FTO), and antimony-doped tin oxide (abbrev. ATO). Among them, the transparent conductive material is preferably an inorganic material containing at least one selected from the group consisting of indium oxide (referred to as In oxide hereinafter), tin oxide (referred to as Sn oxide hereinafter), and zinc oxide (referred to as Zn oxide hereinafter). The In oxide, Sn oxide and Zn oxide are materials, which can be easily formed into a film by sputtering, and give excellent transparency and electroconductivity. Among them, preferred are InSnO, GaZnO, SnO, $In_2O_3$, and ZnO.

Examples of a material constituting the display substrate (with no numeral reference indicated), to which the counter electrode is disposed, include glass, and plastic. In the case where a plastic film is used as the display substrate, a light and flexible display element can be produced.

In the case where a material constituting the counter electrode 2 contains a material that induces a reverse reaction of an oxidation or reduction reaction of the electrochromic composition in the display layer, moreover, a resulting element can perform stable coloring and discharging. Specifically, when a material that induces a reduction reaction is used in the counter electrode 2, in the case where the electrochromic composition colors as a result of oxidization, or a material that induces an oxidization reaction is used as the counter electrode 2, in the case where the electrochromic composition colors as a result of reduction, coloring and discharging reactions in the display layer 5 containing the electroactive composition are performed more stably. As for a material constituting the electrolyte 3, a material prepared by dissolving a supporting electrolyte in a solvent is typically used. In case of a dimming element, particularly, the electrolyte 3 needs to be colorless, and transparent. As for the supporting electrolyte, for example, an inorganic ionic salt (e.g., alkali metal salt, and alkaline earth metal salt), a quaternary ammonium salt, an acid supporting electrolyte, or a base supporting electrolyte can be used. Examples of the supporting electrolyte include $LiClO_4$, $LiBF_4$, $LiAsF_6$, $LiPF_6$, $CF_3SO_3Li$, $CF_3COOLi$, KCl, $NaClO_3$, NaCl, $NaBF_4$, NaSCN, $KBF_4$, $Mg(ClO_4)_2$, and $Mg(BF_4)_2$. These supporting electrolytes may be used alone or in combination.

Examples of the solvent include propylene carbonate, acetonitrile, γ-butyrolactone, ethylene carbonate, sulfolane, dioxolane, tetrahydrofuran, 2-methyltetrahydrofuran, dimethyl sulfoxide, 1,2-dimethoxyethane, 1,2-ethoxymethoxyethane, polyethylene glycol, and alcohol. The aforementioned solvents may be used alone or in combination. The electrolyte is not limited to a liquid electrolyte, in which a supporting electrolyte is dissolved in a solvent. An electrolyte in the form of a gel, or a solid electrolyte, such as a polymer electrolyte, can be used as the electrolyte. As for a solid electrolyte, for example, there is a perfluorosulfonic acid polymer film. The solution-based electrolyte has an advantage that high ion conductivity can be attained. The solid electrolyte is suitable for producing an electrode having high durability without causing deterioration.

As for a driving method of the dimming element 30, any method can be used without any limitation, as long as the predetermined voltage and current can be applied. Use of a passive driving method can produce an inexpensive dimming element. Moreover, use of a transparent active driving element can perform dimming with high precision at high speed. Examples of the transparent active driving element include an IGZO.

The electroactive dimming element of the present invention can be stably operated, and has excellent transparency to light. Accordingly, the electroactive dimming element of the present invention can be suitably used, for example, for an anti-glare mirror, a dimming glass, and dimming spectacles.

EXAMPLES

Examples of the present invention are explained hereinafter, but the present invention is not limited to these examples in any ways.

Example 1

<Synthesis of Electrochromic Compound (Ex.-1)>

Electrochromic Compound (Ex.-1) (identical to Electrochromic Compound (1-1) in Table 1) was synthesized according to the following synthesis scheme (1).

Synthesis Scheme (1)

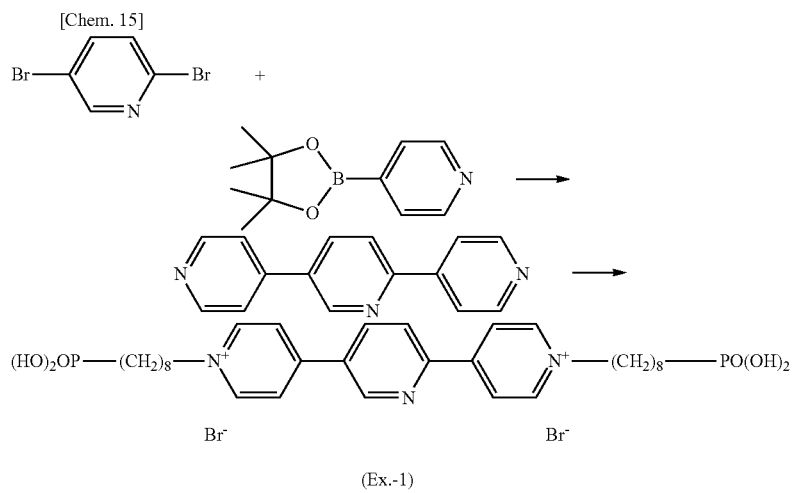

(Ex.-1)

A 100 mL flask was charged with 6.718 g (31.6 mmol) of tripotassium phosphate, 24 mL of water, and 30 mL of 1,4-dioxane, and the resulting mixture was bubbled with argon gas, to thereby remove dissolved oxygen. To the resulting solution, 1.500 g (6.33 mmol) of 2,5-diibromopyridine, 5.19 g (25.33 mmol) of 4-(4,4,5,5-tetramethyl-l,3,2-dioxaborolan-2-yl)pyridine, 0.231 g (0.253 mmol) of tris(dibenzyliden acetone)dipalladium, and 0.224 g (0.607 mmol) of tricyclohexylphosphine tetrafluoroborate were added, and the resulting mixture was stirred for 8 hours at 90 °C under argon atmosphere. After the temperature of the mixture was returned to room temperature, the solvent was removed under the reduced pressure, followed by collecting precipitated solids through filtration. The obtained solids were then washed with water. After drying the solids, the dried solids were purified through column chromatography, to thereby obtain colorless solids (yield by weight: 1.393 g, yield: 93%). Subsequently, a 100 mL flask was charged with 1.000 g (4.479 mmol) of the obtained solids, 4.89 g (17.92 mmol) of bromooctyl phosphonate, and 50 mL of DMF (anhydrous), and the resulting mixture was stirred for 12 hours at 90°C under a (low of argon gas. The temperature of the mixture was then returned to room temperature, followed by adding 2-propanol. Thereafter, the precipitated solids were collected through filtration. The solids were purified through recrystallization in methanol, to thereby obtain 1.70 g (yield: 49%) of Electrochromic Compound (Ex.-1) as colorless solids.

Example 2

<Synthesis of Electrochromic Compound (Ex.-2) (Identical to Electrochromic Compound (1-2) in Table 1))>

Electrochromic Compound (Ex.-2) (yield with two stages: 33%) was obtained as pale yellow solids in the same manner as in Example 1. provided that the synthesis was performed according to the following synthesis scheme (2), and (8-bromooctyl)phosphonate was replaced with (4-(bromomethyl)phenyl)methylphosphonate.

Synthesis Scheme (2)

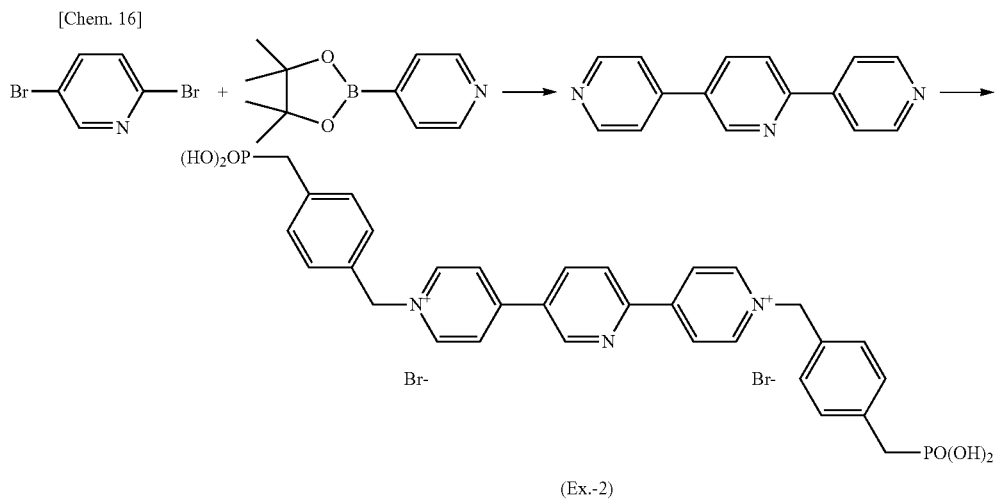

(Ex.-2)

Example 3

<Synthesis of Electrochromic Compound (Ex.-3) (Identical to Electrochromic Compound (1-3) in Table 1 ))>Electrochromic Compound (Ex.-3) (yield with two stages: 25%) was obtained as colorless solids in the same manner as in Example 1, provided that the synthesis was performed according to the following synthesis scheme (3), and 2,5-diibromopyridine was replaced with 2,5-diibromopyrazine.

Synthesis Scheme (3)

[Chem. 17]

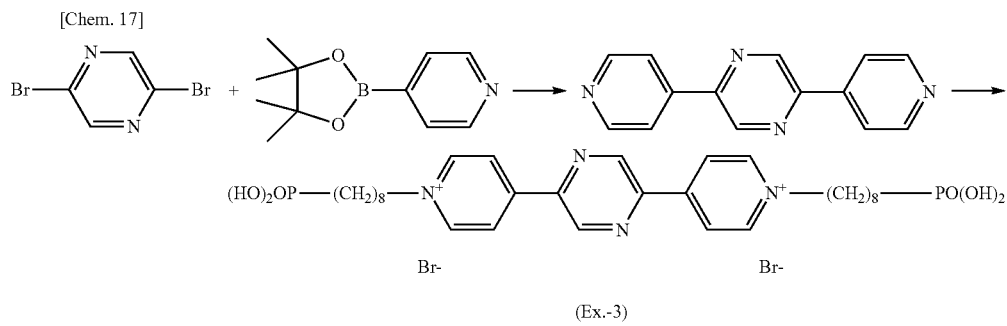

(Ex.-3)

Example 4

<Synthesis of Electrochromic Compound (Ex.-4) (Identical to Electrochromic Compound (1-4) in Table 1))>

Electrochromic Compound (Ex.-4) (yield with two stages: 30%) was obtained as colorless solids in the same manner as in Example 1, provided that the synthesis was performed according to the following synthesis scheme (4), and 2,5-diibromopyridine was replaced with 2,5-diibromopyrimidine.

Synthesis Scheme (4)

[Chem. 18]

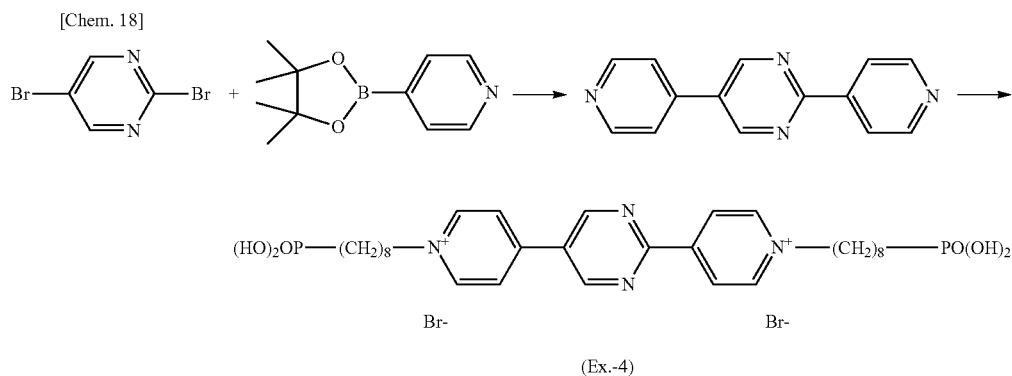

(Ex.-4)

Example 5

<Synthesis of Electrochromic Compound (Ex.-5) (Identical to Electrochromic Compound (1-5) in Table 1))>Electrochromic Compound (Ex.-5) (yield with two stages: 24%) was obtained as colorless solids in the same manner as in Example 1, provided that the synthesis was performed according to the following synthesis scheme (5), and 2,5-diibromopyridine was replaced with 2,5-diibromo-3-methylpyridine.

Synthesis Scheme (5)

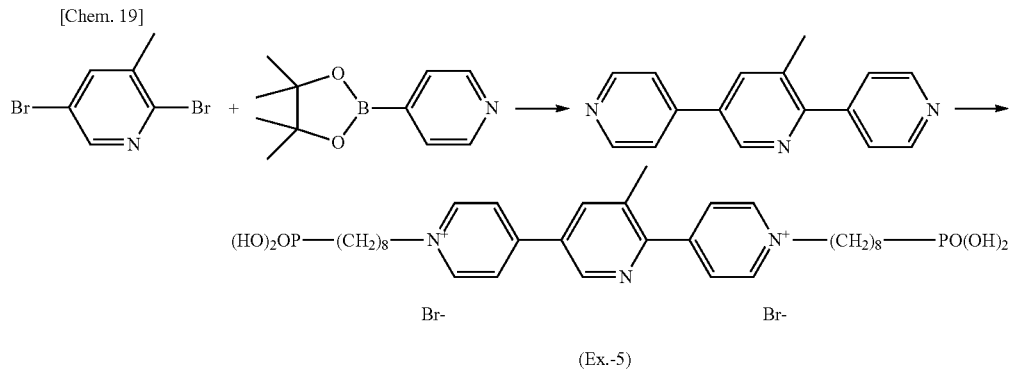

(Ex.-5)

Example 6

<Synthesis of Electrochromic Compound (Ex.-6) (Identical to Electrochromic Compound (1-6) 1))>

Electrochromic Compound (Ex.-6) (yield with two stages: 27%) was obtained as colorless solids in the same manner as in Example 1, provided that the synthesis was performed according to the following synthesis scheme (6), and 2,5-diibromopyridine was replaced with 3,6-diibromo-2-methylpyridine.

<Synthesis of Electrochromic Compound (Ex.-7) (Identical to Electrochromic Compound (1-7) in Table 1))>

Synthesis Scheme (6)

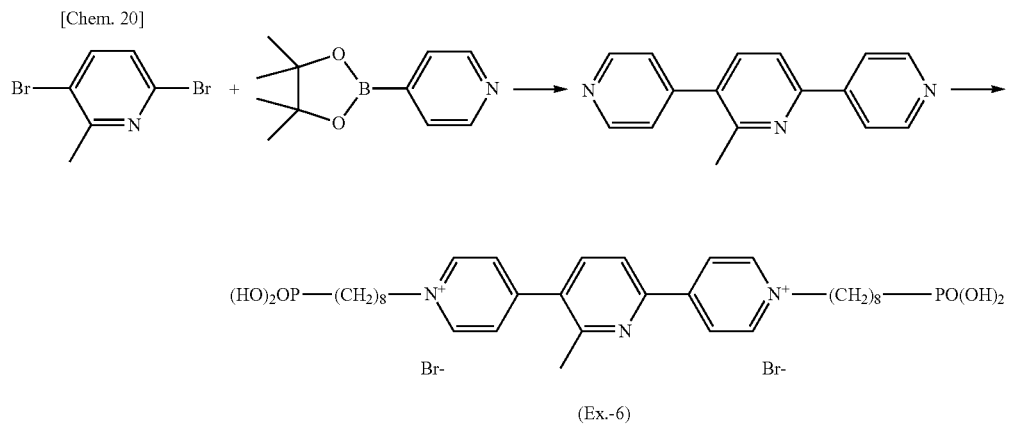

(Ex.-6)

Example 7

Electrochromic Compound (Ex.-7) (yield with two stages: 10%) was obtained as colorless solids in the same manner as in Example 1, provided that the synthesis was performed according to the following synthesis scheme (7), and (8-bromooctyl)phosphonate was replaced with (3-bromopropyl)phosphonate

Synthesis Scheme (7)

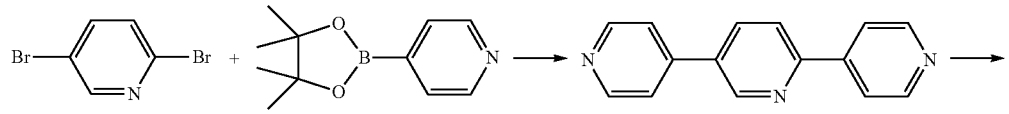

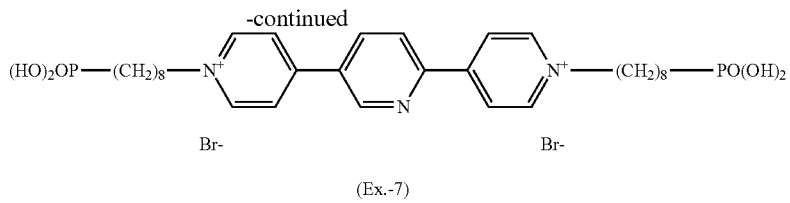

(Ex.-7)

Example 8

<Synthesis of Electrochromic Compound (Ex.-8)>

Electrochromic Compound (Ex.-8) (yield with two stages: 98%) was obtained as colorless solids in the same manner as in Example 1, provided that the synthesis was performed according to the following synthesis scheme (8), and (8-bromooctyl)phosphonate was replaced with (p-(bromomethyl)phenyl)boronic acid.

Example 9

<Synthesis of Electrochromic Compound (Ex.-9)>

Electrochromic Compound (Ex.-9) (yield with two stages: 91%) was obtained as colorless solids in the same manner as in Example 1, provided that the synthesis was performed according to the following synthesis scheme (9), and (8-bromooctyl)phosphonate was replaced with 4-(2-bromoethyl)benzoic acid.

Synthesis Scheme (9)

[Chem. 23]

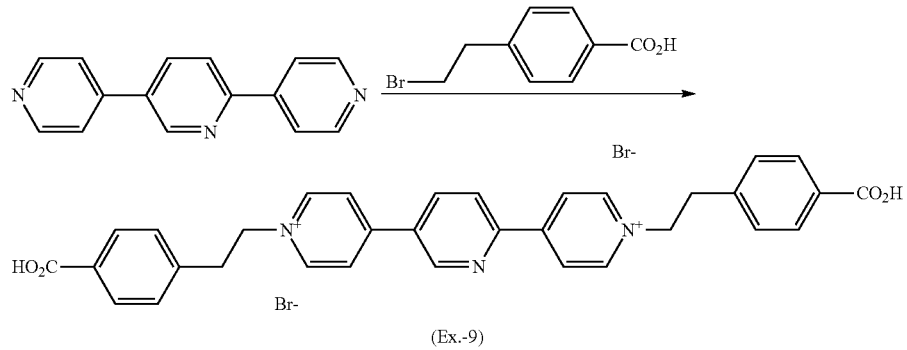

Synthesis Scheme (8)

[Chem. 22]

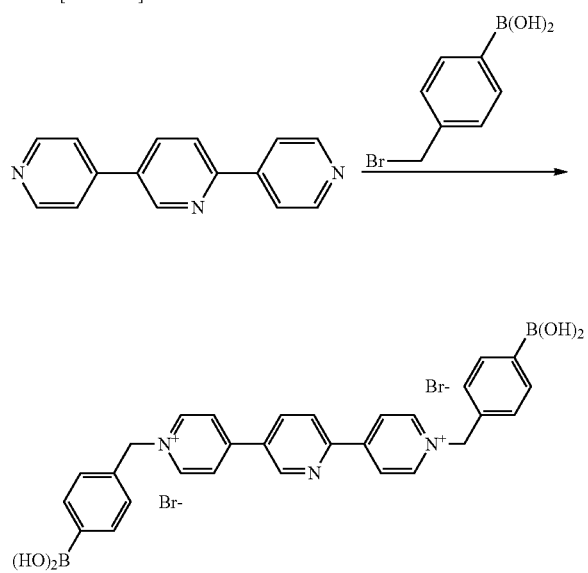

Example 10

<Production of Electrochromic Element>

(a) Formations of Display Electrode and Electrochromic Display Layer First, a glass substrate (first support 11) in the size of 30 mm×30 mm was provided. An ITO film in the thickness of about 100 nm was formed in the 16 mm×23 mm region on the top surface of the glass substrate through sputtering, to thereby form a display electrode (first electrode 12). The sheet resistance between the edges of the display electrode 12 was measured, and the sheet resistance was about 200 Ω.

Subsequently, a titanium oxide nanoparticle dispersion liquid (SP210, manufactured by Showa Co., Ltd.) was applied onto the glass substrate, on which the display electrode had been formed, through spin coating, and the coated film was subjected to annealing for 15 minutes at 120° C., to thereby form a titanium oxide particle film.

Subsequently, a 2,2,3,3-1-tetrafluoropropanol solution containing 1% by mass Electrochromic Compound (1-1) synthesized in Example 1 was applied onto the titanium oxide particle film through spin coating, following by annealing for 10 minutes at 120° C., to thereby form a first electroactive layer 13 (display layer), in which the electrochromic compound had been adsorbed on surfaces of the titanium oxide particles each having the diameter of about 1.0 μm.

[Chem. 24]

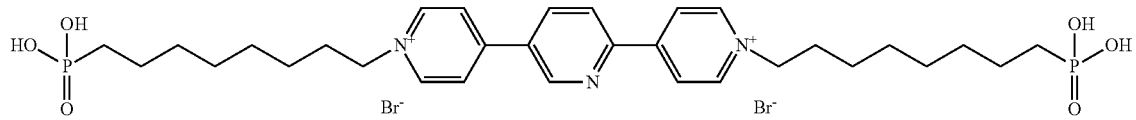

Electrochromic Compound (1-1)

<Formation of Electroactive Layer 16 onto Second Electrode 17 (Counter Electrode)>

In order to form an electrochromic layer, a coating liquid was prepared by blending the following materials with the following blending ratio.

The following triarylamine compound (1) including monofunctional acrylate, represented by the following structural formula: 50 parts by mass IRGACURE184 (manufactured by BASF Japan K.K.): 5 parts by mass PEG400DA including bifunctional acrylate (Nippon Kayaku Co., Ltd.): 50 parts by mass Methyl ethyl ketone: 900 parts by mass

[Chem. 25]

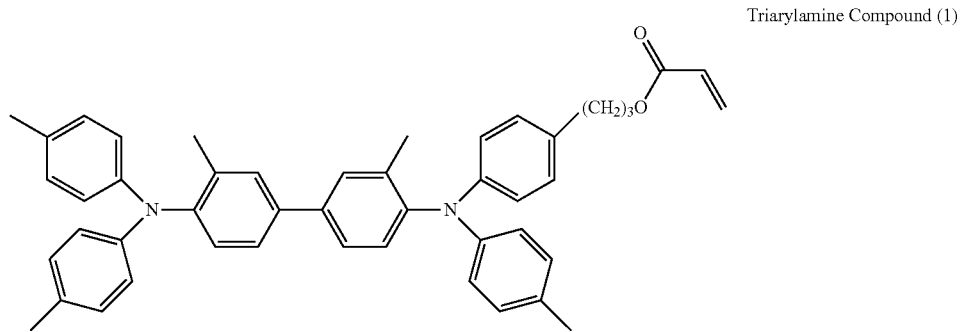

Triarylamine Compound (1)

To an ITO glass substrate (size: 30 mm ×30 mm, thickness: 0.7 mm, thickness of the ITO film: about 100 nm) prepared by sputtering, the obtained coating liquid was applied by spin coating, and the obtained film was cured for 60 seconds by means of a UV irradiation device, followed by annealing for 10 minutes at 60° C., to thereby form a cured crosslinked layer. As a result, a second electroactive layer 16 composed of the polymerized layer (the crosslinked layer) was formed.

<Filling with Electrolyte Layer 15>

As an electrolyte layer 15, a liquid having the following composition was provided.

IRGACURE184 (manufactured by BASF Japan K.K.): 5 parts by mass

PEG400DA (manufactured by Nippon Kayaku Co., Ltd.): 100 parts by mass

Ionic liquid (manufactured by MERCK KGaA): 50 parts by mass

The obtained liquid was measured and collected with a micropipette by 30 mg, and the collected liquid was dripped onto the ITO glass substrate having the first electrode 17 and the electrochromic layer, which had been obtained above. Onto the ITO glass substrate, to which the liquid was dripped, the ITO glass substrate having the crosslinked layer was bonded via a spacer of 75 μm in the manner that drawing parts of the electrodes were provided. The bonded element, as obtained, was cured by applying UV rays to the element for 60 seconds by means of a UV irradiation device, to thereby obtain an electrochromic element.

<Test 1: Coloring Voltage Evaluation>

An optical change of the produced electrochromic element during coloring was monitored (LCD5200, manufactured by Otsuka Electronics Co., Ltd.) under the following conditions. As the first condition, the voltage of minus 1.5 V was applied to the electrochromic element to color. As the second condition, the voltage of minus 2.2 V was applied to the electrochromic element to color. Thereafter, the minimum transmittance with respect to the visible wavelength range was determined, and the result was evaluated based on the following criteria. The minimum transmittance of the transmission spectrum for the coloring was 22%, when the voltage of minus 1.5 V was applied. When the voltage of minus 2.2 V was applied, the minimum transmittance was reduced to 18%. The result is presented in Table 3-2.

—Evaluation Criteria—

Good: The minimum transmittance of the visible wavelength range was 30% or less.

Not good: The minimum transmittance of the visible wavelength range was greater than 30%.

<Test 2: Repeating Test>

<<Electrical Degradation>>

—Evaluation 1—

The predetermined voltages were applied to the electrochromic element to repeatedly color and discharge the produced electrochromic element 500 times. Specifically, the voltage of +2.2 V was applied between the first electrode 12 and the second electrode 17 for 0.4 seconds to inject the charge amount of 3.7 mC. As a result of this process, coloring in black was confirmed in the area where the first electrode 12 and the second electrode 17 were overlapped to each other, due to coloring of each electrochromic compound contained in the first electroactive layer and the second electroactive layer. As a result, the transmittance of the minimum transmittance (650 nm) was reduced to 25%. As for discharging, moreover, the voltage of minus 0.5 V was applied between the first electrode 12 and the second electrode 17 for 2.0 seconds to inject the charge amount of 3.7 mC. The discharging of each electrochromic compound was confirmed due to the reverse reaction. A cycle of the charging and discharging performed in the aforementioned manner was repeated 500 times.

During the process of repeating the coloring-discharging cycle 500 times, the charge amount run through was slightly changed, the charge amount was maintained at 97.6%, and there was no electrical degradation in the entire device. This evaluation was evaluated based on the following criteria, as Evaluation 1. The result is presented in Table 3-2.

—Evaluation Criteria—
A: The charge amount retention rate was 85% or greater.
B: The charge amount retention rate was 40% or greater but less than 85%.
C: The charge amount retention rate was less than 40%.
—Evaluation 2—

Subsequently, a coloring-discharging cycle was repeated 500 times in the aforementioned manner. Electrical and optical changes of the electrochromic element was confirmed before and after the repeated coloring-discharging cycles. The electrical degradation was confirmed by the following method (Evaluation 2).

The predetermined voltage was supplied to the electrochromic element in the same manner as the method for coloring in the repeating test. The voltage of +2.2V was applied between the first electrode 12 and the second electrode 17 for 10 seconds. The charged amount 10 seconds after the coloring, and the variation in the transmission spectrums of discharging and coloring were observed. The coloring was determined as when the charge of 3.7 mC was injected. Comparing with the charge amount before repeating the coloring-discharging cycle, 82.4% of the charge amount was run through the device even after the repeating the coloring-discharging cycle (see FIG. 4). As a result, it was considered that electrical degradation was hardly caused by the repeating the coloring-discharging cycle. The result was evaluated based on the following criteria. The result is presented in Table 3-2.

—Evaluation Criteria—
A: The charge amount retention rate was 80% or greater.
B: The charge amount retention rate was 50% or greater but less than 80%.

C: The charge amount retention rate was less than 50%.
<<Optical Degradation>>

Comparing the transmission spectrums for discharging and coloring, there were no significant change in the both spectrums. The coloring density was also at the similar level, i.e., 30% (see FIG. 5). It was confirmed that the electrochromic element was not affected from any optical degradation. The optical degradation was evaluated based on the following criteria. The result is presented in Table 3-2.

—Evaluation Criteria—
A: The change in the spectrum before and after the test was less than 10%.
B: The change in the spectrum before and after the test was 10% or greater but less than 40%.
C: The change in the spectrum before and after the test was 40% or greater.

Comparative Example 1

The following compound (Comp.-1) (identical to Electrochromic Compound (Comp. 19) in Table 2) was synthesized, and the behavior of the electrochromic reaction was measured in the same manner as in Example 10. The results are presented in Table 3-2.

[Chem. 26]

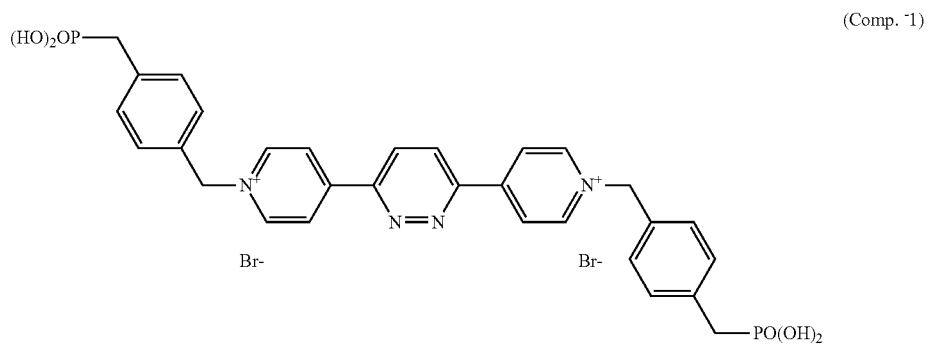

(Comp. -1)

The electrochromic element exhibited color, which had a broad absorption spectrum having the maximum absorption at 570 nm, as a result of the electrochromic reaction. However, the electrochromic element hardly colored after repeating the reaction about 3 times, and the durability of the element was poor. The change in the absorption spectrum of Comparative Example 1 is depicted in FIG. 6. The results are presented in Table 3-2.

Comparative Example 2

The following compound (Comp.-2) (identical to Electrochromic Compound (Comp. 20) in Table 2) was synthesized, and the behavior of the electrochromic reaction was measured in the same manner as in Example 10.

[Chem. 27]

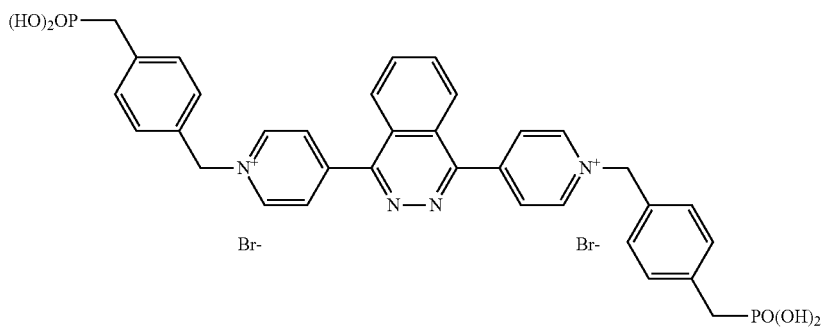

(Comp.-2)

As a result of the electrochromic reaction, the electrochromic element exhibited color, which had the maximum absorption at 620 nm, and had a broad absorption spectrum from 700 nm to 400 nm. After repeating the electrochromic reaction about 3 times, the electrochromic element hardly colored, and the durability of the element was poor. The change in the absorption spectrum of Comparative Example 2 is depicted in FIG. 7.

Comparative Example 3

The following compound (Comp.-3) was synthesized, and the behavior of the electrochromic reaction was measured in the same manner as in Example 10. The results are presented in Table 3-2.

[Chem. 28]

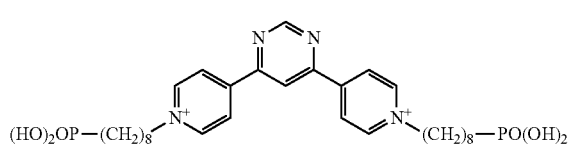

(Comp.-3)

As a result of the electrochromic reaction, the electrochromic element exhibited color, which had the maximum absorption at 450 nm, and had a broad absorption spectrum from 600 nm to 400 nm. However, the coloring density was poor, and it was difficult to discharge the color.

Comparative Example 4

The following compound (Comp.-4) was synthesized, and the behavior of the electrochromic reaction was measured in the same manner as in Example 10. The results are presented in Table 3-2.

[Chem. 29]

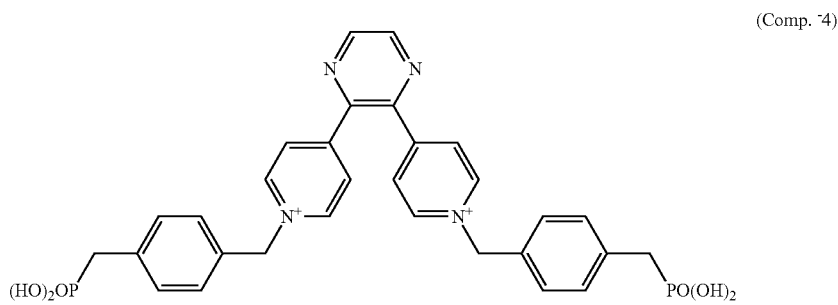

(Comp.-4)

The electrochromic element exhibited a color, which had the maximum absorptions at 850 nm and 450 nm, as a result of the electrochromic reaction. However, the electrochromic element had poor durability to repetitive use, and the electrochromic element stopped discharging after repeating the cycle of coloring and discharging about 3 times.

Example 11

An electrochromic element was produced in the same manner as in Example 10, provided that Electrochromic Compound (1-1) of the first electroactive layer was replaced with Electrochromic Compound (1-2) represented by the following structural formula.

The coloring voltage evaluation and the repeating test were performed on the produced electrochromic element in the same manner as in Example 10. The results are presented in Table 3-2.

[Chem. 30]

Electrochromic Compound (1-2)

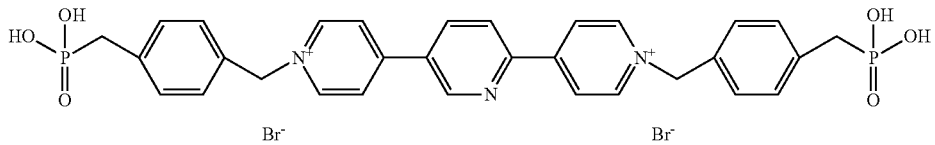

Examples 12 to 15

Electrochromic elements were each produced in the same manner as in Example 10, provided that the triarylamine compound (1) of the second electroactive layer was replaced with triarylamine compounds (2) to (5) represented by the following structural formulae, respectively.

The coloring voltage evaluation and the repeating test were performed on each of the produced electrochromic elements in the same manner as in Example 10. The results are presented in Table 3-2.

[Chem. 31]

Triarylamine Compound (2)

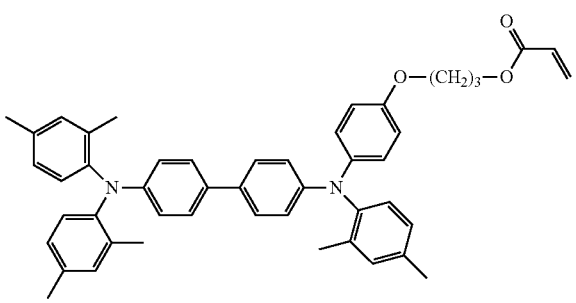

[Chem. 32]

Triarylamine Compound (3)

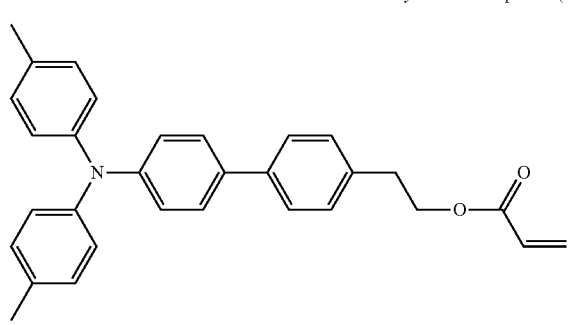

[Chem. 33]

Triarylamine Compound (4)

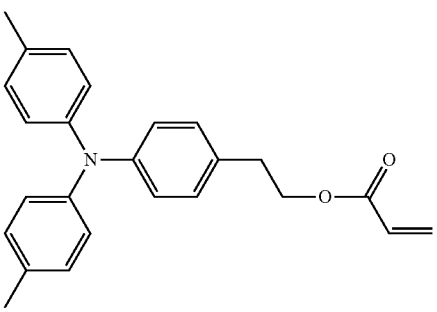

[Chem. 34]

Triarylamine Compound (5)

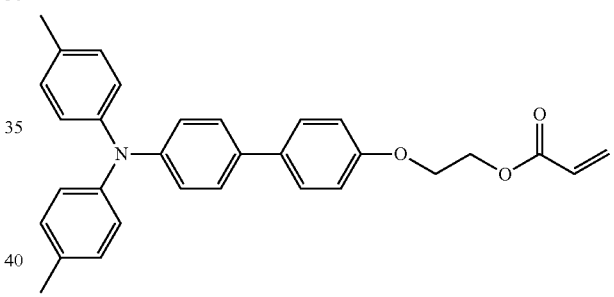

Example 16

An electrochromic element was produced in the same manner as in Example 10, provided that the triarylamine compound (1) of the second electroactive layer was replaced with antimony-doped tin oxide (abbreviation: ATO) that was a transparent conductive material.

The coloring voltage evaluation and the repeating test were performed on the produced electrochromic element in the same manner as in Example 10. The results are presented in Table 3-2.

Examples 17 to 19

Electrochromic elements were each produced in the same manner as in Example 10, provided that Electrochromic Compound (1-1) of the first electroactive layer was replaced with Electrochromic Compounds (1-3), (1-5), and (1-6) represented by the following structural formulae, respectively.

The coloring voltage evaluation and the repeating test were performed on each of the produced electrochromic elements in the same manner as in Example 10. The results are presented in Table 3-2.

[Chem. 35]

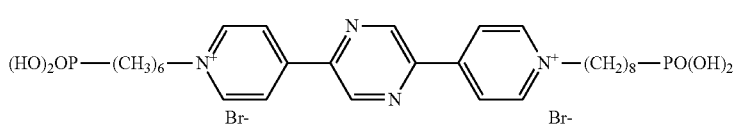

Electrochromic Compound (1-3)

[Chem. 36]

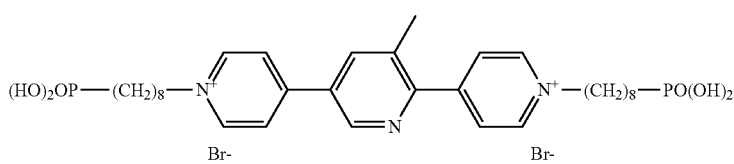

Electrochromic Compound (1-5)

[Chem. 37]

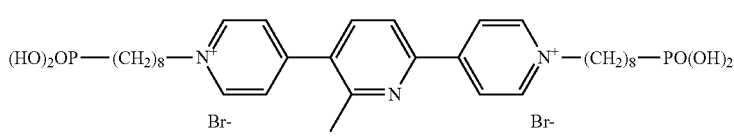

Electrochromic Compound (1-6)

Comparative Examples 5 to 20

Electrochromic elements were each produced in the same manner as in Example 10, provided that Electrochromic Compound (1-1) of the first electroactive layer was replaced with Electrochromic Compounds (Comp. 11) to (Comp. 26), which were represented by the structural formulae of the following Tables 2-1 and 2-2, respectively.

The coloring voltage evaluation and the repeating test were performed on each of the produced electrochromic elements in the same manner as in Example 10. The results are presented in Table 3-2.

TABLE 2-1

| Structural Formula | Compound No. |
|---|---|
| | Electrochromic Compound (Comp. 11) |
| | Electrochromic Compound (Comp. 12) |
| | Electrochromic Compound (Comp. 13) |
| | Electrochromic Compound (Comp. 14) |
| | Electrochromic Compound (Comp. 15) |

TABLE 2-1-continued

| Structural Formula | Compound No. |
|---|---|
| (structure) | Electrochromic Compound (Comp. 16) |
| (structure) | Electrochromic Compound (Comp. 17) |
| (structure) | Electrochromic Compound (Comp. 18) |

TABLE 2-2

| Structural Formula | Compound No. |
|---|---|
| (structure) | Electrochromic Compound (Comp. 19) |
| (structure) | Electrochromic Compound (Comp. 20) |
| (structure) | Electrochromic Compound (Comp. 21) |
| (structure) | Electrochromic Compound (Comp. 22) |
| (structure) | Electrochromic Compound (Comp. 23) |
| (structure) | Electrochromic Compound (Comp. 24) |

TABLE 2-2-continued

| Structural Formula | Compound No. |
|---|---|
| [structure of electrochromic compound with two pyridinium groups linked by naphthalene, with phosphonic acid end groups and Br⁻ counterions] | Electrochromic Compound (Comp. 25) |
| [structure of bipyridinium compound with ethyl group and phosphonic acid group, with Br⁻ counterions] | Electrochromic Compound (Comp. 26) |

TABLE 3-1

|  | A | B |
|---|---|---|
| Ex. 10 | Electrochromic Compound (1-1) | Triarylamine Compound (1) |
| Ex. 11 | Electrochromic Compound (1-2) | Triarylamine Compound (1) |
| Ex. 12 | Electrochromic Compound (1-1) | Triarylamine Compound (2) |
| Ex. 13 | Electrochromic Compound (1-1) | Triarylamine Compound (3) |
| Ex. 14 | Electrochromic Compound (1-1) | Triarylamine Compound (4) |
| Ex. 15 | Electrochromic Compound (1-1) | Triarylamine Compound (5) |
| Ex. 16 | Electrochromic Compound (1-1) | ATO |
| Ex. 17 | Electrochromic Compound (1-8) | Triarylamine Compound (1) |
| Ex. 18 | Electrochromic Compound (1-9) | Triarylamine Compound (1) |
| Ex. 19 | Electrochromic Compound (1-10) | Triarylamine Compound (1) |
| Comp. Ex. 5 | Electrochromic Compound (Comp. 11) | Triarylamine Compound (1) |
| Comp. Ex. 6 | Electrochromic Compound (Comp. 12) | Triarylamine Compound (1) |
| Comp. Ex. 7 | Electrochromic Compound (Comp. 13) | Triarylamine Compound (1) |
| Comp. Ex. 8 | Electrochromic Compound (Comp. 14) | Triarylamine Compound (1) |
| Comp. Ex. 9 | Electrochromic Compound (Comp. 15) | Triarylamine Compound (1) |
| Comp. Ex. 10 | Electrochromic Compound (Comp. 16) | Triarylamine Compound (1) |
| Comp. Ex. 11 | Electrochromic Compound (Comp. 17) | Triarylamine Compound (1) |
| Comp. Ex. 12 | Electrochromic Compound (Comp. 18) | Triarylamine Compound (1) |
| Comp. Ex. 13 | Electrochromic Compound (Comp. 19) | Triarylamine Compound (1) |
| Comp. Ex. 14 | Electrochromic Compound (Comp. 20) | Triarylamine Compound (1) |
| Comp. Ex. 15 | Electrochromic Compound (Comp. 21) | Triarylamine Compound (1) |
| Comp. Ex. 16 | Electrochromic Compound (Comp. 22) | Triarylamine Compound (1) |
| Comp. Ex. 17 | Electrochromic Compound (Comp. 23) | Triarylamine Compound (1) |
| Comp. Ex. 18 | Electrochromic Compound (Comp. 24) | Triarylamine Compound (1) |
| Comp. Ex. 19 | Electrochromic Compound (Comp. 25) | Triarylamine Compound (1) |
| Comp. Ex. 20 | Electrochromic Compound (Comp. 26) | Triarylamine Compound (1) |

*A: the electrochromic compound in the first electroactive layer
*B: the charge-storing material in the second electroactive layer

TABLE 3-2

|  | Test 1 | | Test 2 | | | |
|---|---|---|---|---|---|---|
|  | Applied voltage | | Electrical degradation | | Optical | |
|  | −1.5 V | −2.2 V | Evaluation 1 | Evaluation 2 | degradation | Color |
| Ex. 10 | Good | Good | A | A | A | Black |
| Ex. 11 | Good | Good | A | A | A | Black |
| Ex. 12 | Good | Good | A | A | B | Black |
| Ex. 13 | Good | Good | A | A | A | Orange |
| Ex. 14 | Good | Good | A | A | A | Black |
| Ex. 15 | Good | Good | A | A | B | Black |
| Ex. 16 | Good | Good | A | A | B | Reddish purple |
| Ex. 17 | Good | Good | A | A | A | Black |
| Ex. 18 | Good | Good | A | A | A | Black |
| Ex. 19 | Good | Good | A | A | A | Black |
| Comp. Ex. 5 | Not good | Good | B | B | C | Purple |
| Comp. Ex. 6 | Not good | Not good | C | C | C | Yellowish green |
| Comp. Ex. 7 | Not good | Good | B | A | A | Purple |

TABLE 3-2-continued

|  | Test 1 Applied voltage | | Test 2 Electrical degradation | | Optical degradation | Color |
|---|---|---|---|---|---|---|
|  | −1.5 V | −2.2 V | Evaluation 1 | Evaluation 2 | | |
| Comp. Ex. 8 | Not good | Good | A | B | A | Black |
| Comp. Ex. 9 | Not good | Not good | A | B | A | Black |
| Comp. Ex. 10 | Not good | Not good | C | C | C | Purple |
| Comp. Ex. 11 | Not good | Not good | A | B | B | Black |
| Comp. Ex. 12 | Not good | Not good | C | C | C | Purple |
| Comp. Ex. 13 | Not good | Not good | C | C | C | Black |
| Comp. Ex. 14 | Not good | Not good | A | B | C | Black |
| Comp. Ex. 15 | Not good | Good | A | B | A | Yellowish green |
| Comp. Ex. 16 | Not good | Not good | C | C | C | Orange |
| Comp. Ex. 17 | Not good | Good | B | B | A | Purple |
| Comp. Ex. 18 | Not good | Good | A | A | A | Yellowish green |
| Comp. Ex. 19 | Not good | Not good | C | C | B | Blue |
| Comp. Ex. 20 | Not good | Good | B | B | C | Orange |

It was found from the results of Tables 3-1 and 3-2 that all of Examples 10 to 19 using the compound represented by the general formula (1) had excellent electrochromic durability, compared to Comparative Examples 5 to 20. Regardless of B (the charge-storing material) that was the second electroactive layer, an electrical degradation, such as that electric current did not run through smoothly, was hardly observed in all of Examples 10 to 19, as well as no optical degradation, such as tinting in a discharged state, or significant reduction in coloring density, after the 500 repeating cycles.

Among Examples 10 to 19, however, differences in properties were slightly observed depending on the difference of B (the charge-storing material) that was the second electroactive layer. The charge-storing materials (B) used in Examples are classified into materials that cause a capacitive reaction, such as ATO, and materials that cause an oxidation reaction, such as the triarylamine compound (1) through the triarylamine compound (5). It is presumed from the results that the better properties of the electrochromic element can be secured by using the material that causes an oxidation reaction as the charge-storing material (B), rather than that ATO that causes a capacitive reaction. Among the aforementioned materials, use of the triarylamine compound (1) lead the better properties.

For example, the embodiments of the present invention are as follows.

<1> An electrochromic compound represented by the following general formula (1):

[Chem. 38]

General Formula (1)

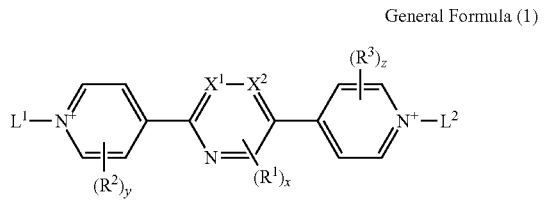

where $X^1$ and $X^2$ are each independently a carbon atom or a nitrogen atom, $R^1$, $R^2$ and $R^3$ are each independently a halogen atom, a substituted or unsubstituted alkyl group, or a substituted or unsubstituted alkoxy group, x is an integer selected from 0 through 3, y and z are each independently an integer selected from 0 through 4, and at least one of $L^1$ and $L^2$ is a monovalent functional group bonded to a nitrogen atom of a pyridinium ring directly, or via a divalent substituent.

<2> The electrochromic compound according to <1>, wherein at least one selected from the group consisting of $R^1$ to $R^3$ and $L^1$ and $L^2$ contains a functional group capable of directly or indirectly bonding to a hydroxyl group.

<3> The electrochromic compound according to <2>, wherein at least of $L^1$ and $L^2$ contains a functional group capable of directly or indirectly bonding to a hydroxyl group.

<4> The electrochromic compound according to <2> or <3>, wherein the functional group capable of directly or indirectly bonding to a hydroxyl group is a phosphonic acid group, a phosphoric acid group, a carboxylic acid group, a silyl group, or a silanol group.

<5> An electrochromic composition comprising:

a conductive or semiconductive nano structure; and the electrochromic compound according to any one of <1> to <4>, where the electrochromic compound can be bonded to or adsorbed on the conductive or semi-conductive nano structure.

<6> An electrochromic element comprising:

a first support;

a first electrode formed on the first support;

a first electroactive layer;

a second support disposed to face the first support;

a second electrode formed on the second support at a side of the first support;

a second electroactive layer; and an electrolyte filling between the first electrode and the second electrode, wherein the first electroactive layer contains an electrochromic compound, which colors through a reduction reaction, and is represented by the following general formula (1), and the second electroactive layer contains a charge-storing material,

[Chem. 39]

General Formula (1)

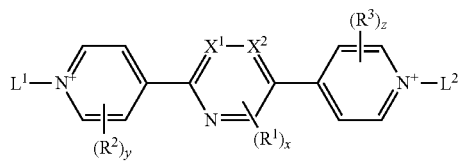

where $X^1$ and $X^2$ are each independently a carbon atom or a nitrogen atom, $R^1$, $R^2$ and $R^3$ are each independently a halogen atom, a substituted or unsubstituted alkyl group, or a substituted or unsubstituted alkoxy group, x is an integer selected from 0 through 3, y and z are each independently an integer selected from 0 through 4, and at least one of $L^1$ and $L^2$ is a monovalent functional group bonded to a nitrogen atom of a pyridinium ring directly, or via a divalent substituent.

<7> The electrochromic element according to <6>, wherein the first electroactive layer contains a mixture of the electrochromic compound represented by the general formula (1), where both $L^1$ and $L^2$ contain a monovalent functional group bonded to a nitrogen atom of a pyridinium ring directly, or via a divalent substituent, and the electrochromic compound represented by the general formula (1), where either $L^1$ or $L^2$ contains a monovalent functional group bonded to a nitrogen atom of a pyridinium ring directly, or via a divalent substituent.

<8> The electrochromic element according to <6> or <7>, wherein the second electroactive layer contains an oxidation-reactive material including a triarylamine structure site, where the oxidation-reactive material including a triarylamine structure site contains a cross-linked product obtained by crosslinking a radically polymerizable compound including a triarylamine structure site, and a polymerizable composition including another radically polymerizable compound different from the radically polymerizable compound including a triarylamine structure site.

<9> The electrochromic element according to <8>, wherein the radically polymerizable compound including a triarylamine structure site, or the another radically polymerizable compound different from the radically polymerizable compound including a triarylamine structure site contains two or more radically polymerizable functional groups.

<10> The electrochromic element according to <8> or <9>, wherein the radically polymerizable compound including a triarylamine structure site is represented by the following general formula (2):

[Chem.40]

$$A_n\text{-}B_m$$

General Formula (2)

where m is 0 when n=2 and m is 0 or 1 when n=1, and at least one of A and B contains a radically polymerizable functional group, A is a structure represented by the following general formula (3), and is bonded to B at a site selected from $R_1$ through $R_{15}$, and B is a structure represented by the following general formula (4), and is bonded to A at a site selected from $R_{16}$ through $R_{21}$,

[Chem. 41]

General Formula (3)

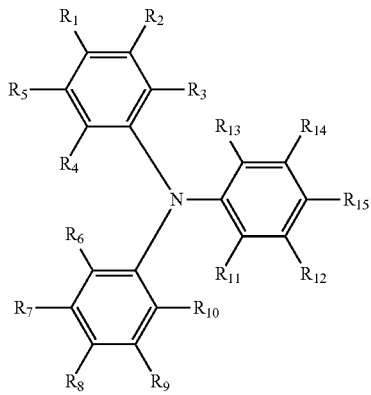

[Chem. 42]

General Formula (4)

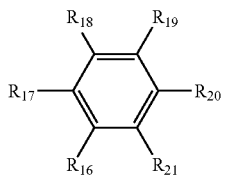

where $R_1$ to $R_{21}$ are monovalent organic groups, which may be identical or different, and at least one of the monovalent organic groups is a radically polymerizable functional group.

<11> The electrochromic element according to any one of <8> to <10>, wherein one or more radically polymerizable functional groups contained in the radically polymerizable compound including a triarylamine structure site are at least one of an acryloyloxy group and a methacryloyloxy group.

<12> An electrochromic dimming element including:
a first support;
a first electrode formed on the first support;
a first electroactive layer;
a second support disposed to face the first support;
a second electrode formed on the second support at a side of the first support;
a second electroactive layer; and
an electrolyte filling between the first electrode and the second electrode,
wherein the first electroactive layer contains an electrochromic compound, which colors through a reduction reaction, and is represented by the following general formula (1), and the second electroactive layer contains a charge-storing material, and
wherein members constituting the electrochromic dimming element are transparent to light,

[Chem. 43]

General Formula (1)

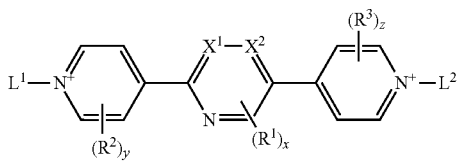

where $X^1$ and $X^2$ are each independently a carbon atom or a nitrogen atom, $R^1$, $R^2$ and $R^3$ are each independently a halogen atom, a substituted or unsubstituted alkyl group, or a substituted or unsubstituted alkoxy group, x is an integer selected from 0 through 3, y and z are each independently an integer selected from 0 through 4, and at least one of $L^1$ and $L^2$ is a monovalent functional group bonded to a nitrogen atom of a pyridinium ring directly, or via a divalent substituent.

The electrochromic compound according to any one of <1> to <4>, the electrochromic composition according to <5>, the electrochromic element according to any one of <6> to <11>, and the electrochromic dimming element according to <12> can solve the various problems in the art, and can achieve the object of the present invention.

REFERENCE SIGNS LIST

1: display electrode
2: counter electrode
3: electrolyte
4a: electrochromic composition
5: display layer
10: electrochromic device
11: first support
12: first electrode
13: first electroactive layer
14: insulating porous layer
15: electrolyte layer
16: second electroactive layer
17: second electrode
18: second support
30: dimming element

The invention claimed is:

1. An electrochromic compound represented by formula (1):

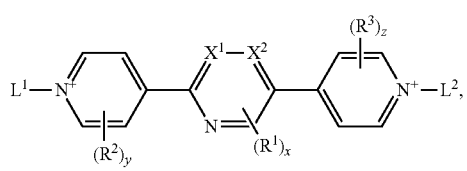

wherein:
$X^1$ is a carbon atom;
$X^2$ is a carbon atom or a nitrogen atom;
$R^1$, $R^2$ and $R^3$ are each independently a halogen atom, a substituted or unsubstituted alkyl group, or a substituted or unsubstituted alkoxy group;
x is an integer selected from 0 through 3;
y and z are each independently an integer selected from 0 through 4, and
$L^1$ and $L^2$ are each independently a monovalent functional group bonded to a nitrogen atom of a pyridinium ring via a divalent hydrocarbon t residue selected from the group consisting of an alkylenyl group that may include a substituent, an alkenylenyl group that may include a substituent, and an arylenyl group that may include a substituent, in which the substituent is independently selected from the group consisting of an alkyl group, an alkenyl group, an alkynyl group and an aryl group.

2. The electrochromic compound according to claim 1, wherein at least one selected from the group consisting of $R^1$ to $R^3$ and $L^1$ and $L^2$ comprises a functional group capable of bonding to a hydroxyl group.

3. The electrochromic compound according to claim 2, wherein at least one of $L^1$ and $L^2$ comprises a functional group capable of bonding to a hydroxyl group.

4. The electrochromic compound according to claim 2, wherein the functional group is a phosphonic acid group, a phosphoric acid group, a carboxylic acid group, a silyl group, or a silanol group.

5. An electrochromic composition, comprising:
a conductive or semiconductive nanostructure; and
the electrochromic compound according to claim 1, wherein the electrochromic compound is optionally bonded to or adsorbed on the conductive or semiconductive nanostructure.

6. An electrochromic element, comprising:
a first support;
a first electrode formed on the first support;
a first electroactive layer;
a second support disposed to face the first support;
a second electrode formed on the second support at a side of the first support;
a second electroactive layer; and
an electrolyte filling between the first electrode and the second electrode,
wherein:
the first electroactive layer comprises an electrochromic compound, which colors through a reduction reaction, and is represented by formula (1):

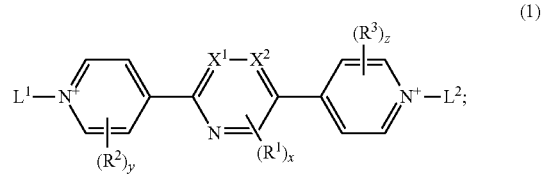

$X^1$ is a carbon atom;
$X^2$ is a carbon atom or a nitrogen atom;
$R^1$, $R^2$ and $R^3$ are each independently a halogen atom, a substituted or unsubstituted alkyl group, or a substituted or unsubstituted alkoxy group;
x is an integer selected from 0 through 3;
y and z are each independently an integer selected from 0 through 4;
$L^1$ and $L^2$ are each indenpendently a monovalent functional group bonded to a nitrogen atom of a pyridinium ring via a divalent hydrocarbon residue selected from the group consisting of an alkylenyl group that may include a substituent, an alkenylenyl group that may include a substituent, and an arylenyl group that may include a substituent, in which the substituent is independently selected from the group consisting of an alkyl group, an alkenyl group, an alkynyl group and an aryl group; and
the second electroactive layer comprises a charge-storing material.

7. The electrochromic element according to claim 6, wherein the first electroactive layer comprises a mixture of:
the electrochromic compound, where both $L^1$ and $L^2$ comprise a monovalent functional group bonded to a nitrogen atom of the pyridinium ring via the divalent substituent; and the electrochromic compound, where either $L^1$ or $L^2$ represent the monovalent functional group bonded to a nitrogen atom of the pyridinium ring via the divalent substituent.

8. The electrochromic element according to claim 6, wherein:
the second electroactive layer comprises an oxidation-reactive material comprising a triarylamine structure site; and
the oxidation-reactive material comprises a cross-linked product obtained by crosslinking a first radically polymerizable compound comprising a triarylamine structure site, and a polymerizable composition comprising a second radically polymerizable compound different from the first radically polymerizable compound.

9. The electrochromic element according to claim 8, wherein the first radically polymerizable compound or the second radically polymerizable compound comprises two or more radically polymerizable functional groups.

10. The electrochromic element according to claim 8, wherein the first radically polymerizable compound is represented by formula (2):

$$A_n\text{-}B_m \qquad \text{Formula (2)},$$

wherein:
m is 0 when n=2 and m is 0 or 1 when n=1; and
at least one of A and B comprises a radically polymerizable functional group;
A is a structure represented by formula (3), and is bonded to B at a site selected from the group consisting of $R_1$ through $R_{15}$:

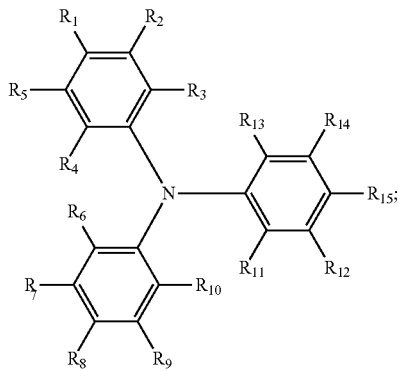

(3)

B is a structure represented by formula (4), and is bonded to A at a site selected from the group consisting of $R_{16}$ through $R_{21}$:

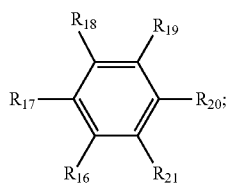

(4)

$R_1$ to $R_{21}$ are monovalent organic groups, which are optionally identical or different; and
at least one of the monovalent organic groups is a radically polymerizable functional group.

11. The electrochromic element according to claim 8, wherein one or more radically polymerizable functional groups contained in the first radically polymerizable compound are at least one of an acryloyloxy group and a methacryloyloxy group.

12. An electrochromic dimming element, comprising:
a first support;
a first electrode formed on the first support;
a first electroactive layer;
a second support disposed to face the first support;
a second electrode formed on the second support at a side of the first support;
a second electroactive layer; and
an electrolyte filling between the first electrode and the second electrode,
wherein:
the first electroactive layer comprises an electrochromic compound, which colors through a reduction reaction, and is represented by al formula (1):

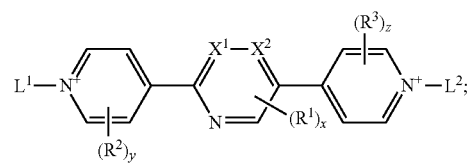

(1)

$X^1$ is a carbon atom;
$X^2$ is a carbon atom or a nitrogen atom;
$R^1$, $R^2$ and $R^3$ are each independently a halogen atom, a substituted or unsubstituted alkyl group, or a substituted or unsubstituted alkoxy group;
x is an integer selected from 0 through 3;
y and z are each independently an integer selected from 0 through 4;
$L^1$ and $L^2$ are each independently a monovalent functional group bonded to a nitrogen atom of a pyridinium ring via a divalent hyrdocarbon residue selected from the group consisting of an alkylenyl group that may include a substituent, an alkenylenyl group that may include a substituent, and an arylenyl group that may include a substituent, in which the substituent is independently selected from the group consisting of an alkyl group, an alkenyl group, an alkynyl group and an aryl group;
the second electroactive layer comprises a charge-storing material; and
members constituting the electrochromic dimming element are transparent to light.

* * * * *